(12) United States Patent
    Falk et al.

(10) Patent No.: US 11,940,713 B2
(45) Date of Patent: Mar. 26, 2024

(54) ACTIVE ELECTRO-OPTIC QUANTUM TRANSDUCERS COMPRISING RESONATORS WITH SWITCHABLE NONLINEARITIES

(71) Applicant: International Business Machines Corporation, Armonk, NY (US)

(72) Inventors: Abram L Falk, Port Chester, NY (US); Jason S. Orcutt, Katonah, NY (US); Chi Xiong, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 749 days.

(21) Appl. No.: 17/094,365

(22) Filed: Nov. 10, 2020

(65) Prior Publication Data
    US 2022/0146905 A1    May 12, 2022

(51) Int. Cl.
    *G02F 1/35*    (2006.01)
    *G06N 10/00*   (2022.01)
    *H04B 10/70*   (2013.01)

(52) U.S. Cl.
    CPC ........... *G02F 1/3501* (2013.01); *G06N 10/00* (2019.01); *H04B 10/70* (2013.01)

(58) Field of Classification Search
    CPC ........ G02F 1/3501; G06N 10/00; H04B 10/70
    See application file for complete search history.

(56) References Cited

U.S. PATENT DOCUMENTS

| 3,877,782 | A | * | 4/1975 | Kaminow | ............. | G02F 1/0353 |
|           |   |   |        |         |               | 385/16      |
| 4,005,927 | A | * | 2/1977 | Caton   | ............. | G02F 1/0356 |
|           |   |   |        |         |               | 385/16      |
| 4,251,130 | A | * | 2/1981 | Marcatili | .......... | G02F 1/3134 |
|           |   |   |        |         |               | 385/9       |
| 4,372,643 | A | * | 2/1983 | Liu     | ............. | G02F 1/3134 |
|           |   |   |        |         |               | 385/132     |
| 4,380,364 | A | * | 4/1983 | Marcatili | .......... | G02F 1/0356 |
|           |   |   |        |         |               | 385/27      |
| 4,448,479 | A | * | 5/1984 | Alferness | .......... | G02F 1/3134 |
|           |   |   |        |         |               | 385/28      |

(Continued)

FOREIGN PATENT DOCUMENTS

| CA | 2923017 C     | 9/2017 |
| WO | 2018002770 A1 | 1/2018 |

(Continued)

OTHER PUBLICATIONS

Akiyama et al., High-speed and efficient silicon modulator based on forward-biased pin diodes, Frontiers in Physics, V. 2, DOI 10.3389/fphy.2014.00065m 2014 (Year: 2014).*

(Continued)

*Primary Examiner* — Peter Radkowski
(74) *Attorney, Agent, or Firm* — Amin, Turocy & Watson, LLP

(57) ABSTRACT

A quantum transducer device that comprises a microwave resonator component and optical resonator component that receives and transduce a set of optical photons and at least one of: a voltage pulse or modulated laser pulse, and generate a single microwave photon output.

20 Claims, 13 Drawing Sheets

(56) References Cited

U.S. PATENT DOCUMENTS

| | | | | |
|---|---|---|---|---|
| 4,468,086 A * | 8/1984 | Liu | G02F 1/0356 | 385/9 |
| 4,553,810 A * | 11/1985 | Alferness | G02F 1/0356 | 385/132 |
| 5,619,607 A * | 4/1997 | Djupsjobacka | G02F 1/2255 | 385/129 |
| 6,129,864 A * | 10/2000 | Imaeda | G02B 6/136 | 264/1.24 |
| 6,310,700 B1 * | 10/2001 | Betts | G02F 1/2255 | 359/2 |
| 6,483,953 B1 * | 11/2002 | McBrien | G02F 1/0356 | 385/2 |
| 6,580,840 B1 * | 6/2003 | McBrien | G02F 1/2255 | 385/2 |
| 6,647,158 B2 * | 11/2003 | Betts | G02F 1/2257 | 385/2 |
| 6,950,580 B2 * | 9/2005 | Mitomi | G02F 1/2255 | 385/40 |
| 6,958,852 B2 * | 10/2005 | Aoki | G02F 1/2255 | 359/315 |
| 7,027,668 B2 * | 4/2006 | Tavlykaev | G02F 1/0356 | 359/254 |
| 7,035,485 B2 * | 4/2006 | Kondo | G02F 1/0305 | 385/40 |
| 7,382,943 B1 * | 6/2008 | Heaton | G02F 1/2255 | 385/40 |
| 7,426,321 B2 * | 9/2008 | Eriksson | G02F 1/035 | 385/2 |
| 7,502,530 B2 * | 3/2009 | Kondo | G02F 1/0356 | 385/40 |
| 7,801,400 B2 * | 9/2010 | Sugiyama | G02F 1/035 | 385/32 |
| 8,094,359 B1 * | 1/2012 | Matsko | G02F 1/0356 | 359/239 |
| 8,300,992 B2 * | 10/2012 | Murata | G02F 1/225 | 385/2 |
| 8,549,740 B1 * | 10/2013 | Hwu | H01P 11/002 | 333/135 |
| 8,737,773 B2 * | 5/2014 | Motoya | G02F 1/2255 | 385/2 |
| 9,260,289 B2 * | 2/2016 | Park | B82Y 20/00 | |
| 9,270,385 B2 * | 2/2016 | Meyers | H04B 10/70 | |
| 9,350,460 B2 * | 5/2016 | Paik | G06N 10/00 | |
| 9,470,952 B2 * | 10/2016 | Dagli | G02B 6/125 | |
| 9,523,871 B2 * | 12/2016 | Kitamura | G02F 1/218 | |
| 9,664,931 B1 * | 5/2017 | Yap | G02F 1/225 | |
| 9,671,670 B2 * | 6/2017 | Hollis | G02B 6/14 | |
| 9,733,543 B2 * | 8/2017 | Dagli | G02F 1/0121 | |
| 9,746,743 B1 * | 8/2017 | Rabiei | G02B 6/12009 | |
| 9,857,609 B2 * | 1/2018 | Bishop | G02B 6/29341 | |
| 10,027,032 B2 * | 7/2018 | Kirino | H01Q 21/0006 | |
| 10,088,734 B2 * | 10/2018 | Kondou | G02F 1/2255 | |
| 10,197,884 B2 * | 2/2019 | Dagli | G02F 1/2255 | |
| 10,295,582 B2 * | 5/2019 | Bishop | G06N 10/00 | |
| 10,320,083 B2 * | 6/2019 | Kirino | H01Q 13/16 | |
| 10,367,664 B2 * | 7/2019 | Welch | H04B 10/516 | |
| 11,009,659 B2 * | 5/2021 | Ward | G02B 6/125 | |
| 11,054,590 B1 * | 7/2021 | Wan | G02B 6/4278 | |
| 11,092,873 B1 * | 8/2021 | Loncar | G02F 2/02 | |
| 2001/0008589 A1 * | 7/2001 | Sasame | G03G 15/0194 | 399/167 |
| 2002/0048076 A1 * | 4/2002 | Kondo | G02F 1/0356 | 359/322 |
| 2002/0071622 A1 * | 6/2002 | Betts | G02F 1/2257 | 385/2 |
| 2002/0154842 A1 * | 10/2002 | Betts | G02F 1/0316 | 385/2 |
| 2003/0228081 A1 * | 12/2003 | Tavlykaev | G02F 1/0356 | 385/3 |
| 2007/0058896 A1 * | 3/2007 | Toyoda | G02B 6/12011 | 385/40 |
| 2010/0067840 A1 * | 3/2010 | Sugiyama | G02F 1/0356 | 385/2 |
| 2011/0038034 A1 * | 2/2011 | Kashyap | G02F 1/3775 | 359/328 |
| 2011/0158576 A1 * | 6/2011 | Kissa | G02F 1/225 | 385/2 |
| 2011/0262071 A1 * | 10/2011 | Mitomi | G02F 1/0508 | 385/2 |
| 2012/0230627 A1 * | 9/2012 | Motoya | G02F 1/0356 | 385/3 |
| 2014/0104666 A1 * | 4/2014 | Minoia | G02F 1/0121 | 359/245 |
| 2014/0314419 A1 * | 10/2014 | Paik | B82Y 10/00 | 398/115 |
| 2015/0055961 A1 * | 2/2015 | Meyers | G06N 10/00 | 398/140 |
| 2015/0060756 A1 * | 3/2015 | Park | B81B 7/0093 | 257/9 |
| 2015/0147038 A1 * | 5/2015 | Asai | G02F 1/3501 | 385/122 |
| 2016/0062155 A1 * | 3/2016 | Ichikawa | G02F 1/025 | 385/3 |
| 2016/0139486 A1 * | 5/2016 | Dagli | G02F 1/01708 | 438/69 |
| 2016/0202592 A1 * | 7/2016 | Hollis | G02F 1/2255 | 385/2 |
| 2016/0313579 A1 * | 10/2016 | Yokoyama | G02F 1/365 | |
| 2017/0023842 A1 * | 1/2017 | Dagli | G02F 1/2257 | |
| 2017/0082877 A1 * | 3/2017 | Arimoto | G02F 1/025 | |
| 2017/0110802 A1 * | 4/2017 | Kirino | H01Q 13/16 | |
| 2017/0248832 A1 * | 8/2017 | Kippenberg | G02F 1/353 | |
| 2017/0261770 A1 * | 9/2017 | Bishop | G02B 6/29341 | |
| 2017/0307954 A1 * | 10/2017 | Dagli | G02B 6/42 | |
| 2018/0003753 A1 * | 1/2018 | Bishop | G06N 10/00 | |
| 2018/0113373 A1 * | 4/2018 | Witmer | G02F 1/017 | |
| 2018/0120666 A1 * | 5/2018 | Kondou | G02F 1/2255 | |
| 2018/0301819 A1 * | 10/2018 | Kirino | G01S 1/00 | |
| 2018/0309207 A1 * | 10/2018 | Kirino | H01P 3/00 | |
| 2018/0329269 A1 * | 11/2018 | Ward | G02F 1/2255 | |
| 2018/0341164 A1 * | 11/2018 | Williams | G02F 1/2257 | |
| 2018/0361400 A1 * | 12/2018 | Oh | G01N 33/48721 | |
| 2019/0196099 A1 * | 6/2019 | Watanuki | G02F 1/2257 | |
| 2019/0227350 A1 * | 7/2019 | Puckett | H04B 10/548 | |
| 2019/0293972 A1 * | 9/2019 | Sasaki | G02B 6/12 | |
| 2019/0296443 A1 * | 9/2019 | Kirino | H01P 3/123 | |
| 2019/0346625 A1 * | 11/2019 | Cheng | G03F 7/2051 | |
| 2019/0391415 A1 * | 12/2019 | Lipson | A61N 5/0622 | |
| 2020/0234171 A1 * | 7/2020 | Chu | H10N 30/30 | |
| 2021/0224678 A1 * | 7/2021 | Wan | G02B 6/42 | |

FOREIGN PATENT DOCUMENTS

| | | | |
|---|---|---|---|
| WO | 2020127299 A1 | 6/2020 | |
| WO | WO-2020180391 A1 * | 9/2020 | G02B 6/42 |

OTHER PUBLICATIONS

Stepanenko et al., Optimization of RF electrodes for electro-optic modulator based on quantum-confined Stark effect, 2019 J. Phys.: Conf. Ser. 1145 012028 (Year: 2019).*

Wang et al., Integrated lithium niobate electro-optic modulators operating at CMOS-compatible voltages. Nature 562, 101-104 (2018). https://doi.org/10.1038/s41586-018-0551-y (Year: 2018).*

Cheng Wang, Carsten Langrock, Alireza Marandi, Marc Jankowski, Mian Zhang, Boris Desiatov, Martin M. Fejer, and Marko Lončar, "Ultrahigh-efficiency wavelength conversion in nanophotonic periodically poled lithium niobate waveguides," Optica 5, 1438-1441 (2018) (Year: 2018).*

Wang, Cheng, Lithium Niobate Nonlinear Nanophotonics, Dissertation, SEAS, Harvard University, 2017 (Year: 2017).*

Cheng Wang, Mian Zhang, Brian Stern, Michal Lipson, and Marko Lončar, "Nanophotonic lithium niobate electro-optic modulators," Opt. Express 26, 1547-1555 (2018) (Year: 2018).*

Lewen et al., Ultra high-speed segmented traveling-wave electroabsorption modulators, OSA/OFC 2003, PD38-1 (Year: 2003).*

(56) References Cited

OTHER PUBLICATIONS

David Patel, Samir Ghosh, Mathieu Chagnon, Alireza Samani, Venkat Veerasubramanian, Mohamed Osman, and David V. Plant, "Design, analysis, and transmission system performance of a 41 GHz silicon photonic modulator," Opt. Express 23, 14263-14287 (2015) (Year: 2015).*
Yudistira et al., Surface acoustic wave generation in-cut superlattices using coplanar electrodes, Appl. Phys. Lett. 95, 052901 (2009) https://doi.org/10.1063/1.3190518 (Year: 2009).*
Shao et al., Microwave-to-optical conversion using lithium niobate thin-film acoustic resonators, Optica 6, 1498-1505 (2019), available Jul. 11, 2019 at https://arxiv.org/pdf/1907.08593.pdf (Year: 2019).*
Tadesse, S., Li, M. Sub-optical wavelength acoustic wave modulation of integrated photonic resonators at microwave frequencies. Nat Commun 5, 5402 (2014). https://doi.org/10.1038/ncomms6402 (Year: 2014).*
Shuang Wang, Zhibin Wang, Xie Han, and Kewu Li, "Measurement method of electro-optic coefficients using photoelastic modulation," Appl. Opt. 58, 4271-4276 (2019) (Year: 2019).*
Rao, Ashutosh, "Thin-film Lithium Niobate Photonics for Electro-optics, Nonlinear Optics, and Quantum Optics on Silicon" (2018). Electronic Theses and Dissertations. 5836. https://stars.library.ucf.edu/etd/5836 (Year: 2018).*
Lu et al., "Aluminum nitride integrated photonics platform for the ultraviolet to visible spectrum," Opt. Express 26, 11147-11160 (2018) (Year: 2018).*
Caspani et al. Integrated sources of photon quantum states based on nonlinear optics. Light Sci Appl 6, e17100 (2017). https://doi.org/10.1038/lsa.2017.100 (Year: 2017).*
Peairs, Gregory Alexander, Fast and e_cient transducers for microwave-optical quantum communication, Dissertation, University of California, Santa Barbara, 2019, https://escholarship.org/uc/item/0dd4s9s4 (Year: 2019).*
Rodrigues et al., Coupling microwave photons to a mechanical resonator using quantum interference. Nat Commun 10, 5359 (2019). https://doi.org/10.1038/s41467-019-12964-2 (Year: 2019).*
Fan et al. Superconducting cavity electro-optics: A platform for coherent photon conversion between superconducting and photonic circuits. Sci. Adv.4, eaar4994(2018).DOI:10.1126/sciadv.aar4994 (Year: 2016).*
McKenna et al., Cryogenic microwave-to-optical conversion using a triply resonant lithium-niobate-on-sapphire transducer, Optica 7, 1737-1745 (2020), arXiv:2005.00897v1, [Submitted on May 2, 2020] (Year: 2020).*
Mirhossein et al., Quantum transduction of optical photons from a superconducting qubit, Submitted on Apr. 9, 2020, arXiv: 2004.04838v1 (Year: 2020).*
Response to the communication pursuant to Rules 161(1) and 162 EPC received for European Patent Application Serial No. 21807069.6 dated Jun. 28, 2023, 5 pages.
Mirhosseini et al., "Quantum transduction of optical photons from a superconducting qubit", pp. 1-17 (2020).
Tsang et al., "Cavity quantum electro-optics. II. Input-output relations between traveling optical and microwave fields". Phys. Rev. A. 84, 1-8 (2011).
Fan et al., "Superconducting cavity electro-optics : A platform for coherent photon conversion between superconducting and photonic circuits", pp. 1-6 (2018).
Orcutt et al., Engineering electro-optics in SiGe/Si waveguides for quantum transduction. Quantum Sci. Technol. in press, 1018 (2020).
Witmer et al., "A silicon-organic hybrid platform for quantum microwave-to-optical transduction" (2019) (available at http://arxiv.org/abs/1912.10346).
Lambert et al., "Coherent conversion between microwave and optical photons—an overview of physical implementations" arXiv:1906.10255v1 [physics.optics] Jun. 24, 2019, 17 pages.
International Search Report and Written Opinion received for PCT Application Serial No. PCT/EP2021/080872 dated Mar. 3, 2022, 13 pages.
Hease et al., "Cavity quantum electro-optics: Microwave-telecom conversion in the quantum ground state", arXiv:2005.12763v1 [quant-ph], May 27, 2020, 16 pages.
McKenna et al., "Cryogenic microwave-to-optical conversion using a triply-resonant lithium niobate on sapphire transducer", Optica, vol. 7, No. 12 , Dec. 2020, pp. 1737-1745, 9 pages.

* cited by examiner

ACTIVE ELECTRO-OPTIC QUANTUM TRANSDUCERS COMPRISING RESONATORS WITH SWITCHABLE NONLINEARITIES

TECHNICAL FIELD

The subject disclosure relates to the electro-optic quantum transducers, and more specifically, to up-convert microwave photons from a superconducting quantum processor to optical photons in the infrared telecommunication bands for the distribution of quantum information.

BACKGROUND

Quantum computing is generally the use of quantum-mechanical phenomena to perform computing and information processing functions. Quantum computing can be viewed in contrast to classical computing, which generally operates on binary values with transistors. That is, while classical computers can operate on two basis states that are either 0 or 1, quantum computers operate on quantum bits that comprise superposition of both 0 and 1, can entangle multiple quantum bits, and use interference. Quantum computing is emerging as a new paradigm to solve a wide class of problems that show unfavorable scaling on a conventional classical high-performance computer. Quantum information technology based on superconducting qubits has created much interest in converting quantum states from the microwave to the optical domain. Optical photons, unlike microwave photons, can be transmitted by optical fiber, making it suitable for long distance quantum communication. Moreover, the optical domain offers access to a large set of well-developed quantum optical tools, such as highly efficient single-photon detectors and long-lived quantum memories. For a high-fidelity microwave to an optical transducer, efficient conversion at single photon level and low added noise are needed. In particular, networks of quantum computers based on superconducting qubits are likely to require quantum transducers, which can convert single photons from one frequency to another while maintaining high state-transfer fidelity of quantum information.

SUMMARY

The following presents a summary to provide a basic understanding of one or more embodiments of the invention. This summary is not intended to identify key or critical elements, delineate scope of particular embodiments or scope of claims. Its sole purpose is to present concepts in a simplified form as a prelude to the more detailed description that is presented later.

In accordance with an embodiment, a system, comprises an electro-optic system incorporating a quantum transducer device, that executes the following computer executable components: a microwave resonator and an optical resonator that receive and transduce a set of optical photons and at least one of a voltage pulse or modulated laser pulse, and generate a single microwave photon output.

In an optional aspect, the tuning component comprises a nonlinear optical material that can be selectively switched on or off with a voltage to mitigate critical coupling requirements.

In accordance with an embodiment, a system implemented method, comprises: using an electro-optic system incorporating a quantum transducer device, to execute system executable components to perform the following acts: in a down conversion, an optical resonator interacts with the microwave resonator that transduces single optical photons to single microwave photons, wherein the transducing occurs based on at least one of: a voltage pulse applied to the microwave resonator, or a modulated laser pulse applied to the optical resonator.

In accordance with an embodiment, a system implemented method, comprises: using an electro-optic system incorporating a quantum transducer device, to execute system executable components to perform the following acts: in an up-conversion, an optical resonator interacting with the microwave resonator that transduces single microwave photons to single optical photons, wherein the transducing occurs based on at least one of: a voltage pulse applied to the microwave resonator, or a modulated laser pulse applied to the optical resonator.

In an optional aspect, the system implemented method further comprises mapping, by the system, a tuning component comprising a nonlinear optical material that can be selectively switched on or off with a voltage to mitigate critical coupling requirement.

DETAILED DESCRIPTION

Figure 1:
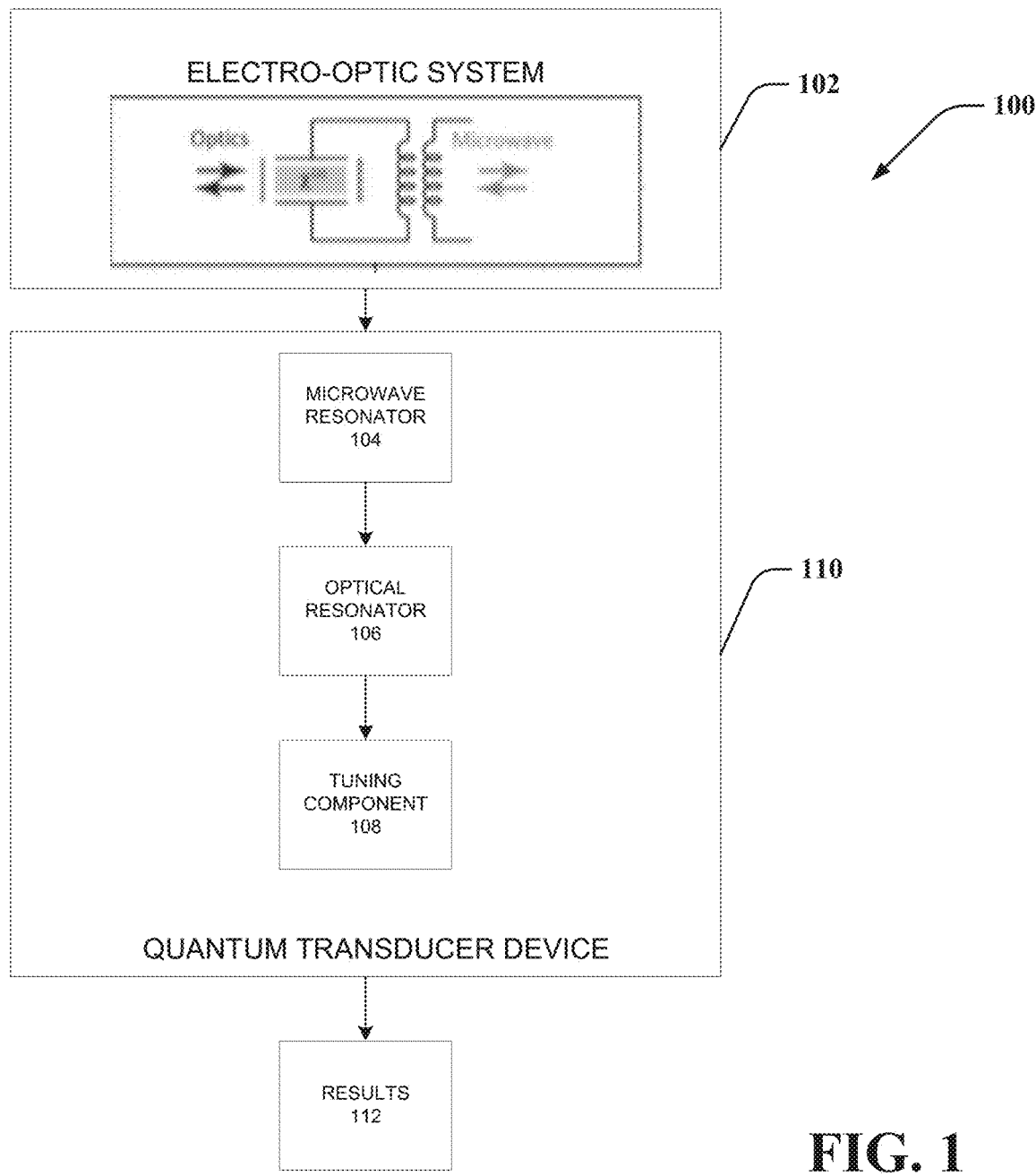
FIG. 1 illustrates a block diagram of an example system implementation that up-converts microwave photons from a superconducting quantum processor to optical photons in the infrared telecommunication bands for the distribution of quantum information.

The following detailed description is merely illustrative and is not intended to limit embodiments and/or application or uses of embodiments. Furthermore, there is no intention to be bound by any expressed or implied information presented in the preceding Summary section, or in the Detailed Description section. One or more embodiments are now described with reference to the drawings, wherein like reference numerals are used to refer to like elements throughout. In the following description, for purposes of explanation, numerous specific details are set forth in order to provide a more thorough understanding of the one or more embodiments. It is evident; however, in various cases, that the one or more embodiments can be practiced without these specific details.

The subject disclosure relates generally to systems and methods that up-converts microwave photons from a superconducting quantum processor (a "hub") to optical photons in the infrared telecommunications bands for the distribution of quantum information. Such infrared photons can travel long distances in optical fibers (a "spoke") without attenuation or interference. At another hub, such as another superconducting quantum processor, another quantum transducer can convert the photon from the infrared back to the microwave domain. Embodiments disclosed herein use tunable nonlinear optical materials that can be switched on and off with a voltage to bypass the need for a critical coupling.

Quantum computation uses a qubit as its essential unit instead of a classical computing bit. The qubit (e.g., quantum binary digit) is the quantum-mechanical analog of the classical bit. Whereas classical bits can employ on only one of two basis states (e.g., 0 or 1), qubits can employ on superpositions of those basis states (e.g., $\alpha|0>+\beta|1>$, where $\alpha$ and $\beta$ are complex scalars such that $|\alpha|^2+|\beta|^2=1$), allowing several qubits to theoretically hold exponentially more information than the same number of classical bits. Thus, quantum computers (e.g., computers that employ qubits instead of solely classical bits) can, in theory, quickly solve problems that can be extremely difficult for classical computers. The bits of a classical computer are simply binary digits, with a value of either 0 or 1. Almost any device with two distinct states can serve to represent a classical bit: a switch, a valve, a magnet, a coin, etc. Qubits, partaking of the quantum mystique, can occupy a superposition of 0 and 1 states. It's not that the qubit can have an intermediate value, such as 0.63; when the state of the qubit is measured, the result is either 0 or 1. But in the course of a computation, a qubit can act as if it were a superposition of states—for example: 63 percent 0 and 37 percent 1. General quantum programs require coordination of quantum and classical parts of a computation. One way to think about general quantum programs is to identify processes and abstractions involved in specifying a quantum algorithm, transforming the algorithm into executable form, running an experiment or simulation, and analyzing the results. A notion throughout these processes is the use of intermediate representations. An intermediate representation (IR) of computation is neither its source language description nor the target machine instructions, but something in between. Compilers may use several IRs during the process of translating and optimizing a program. The input is a source code describing a quantum algorithm and compile time parameter(s). The output is a combined quantum/classical program expressed using a high-level IR. A distinction between a quantum and classical computer is that the quantum computer is probabilistic, thus measurements of algorithmic outputs provide a proper solution within an algorithm specific confidence interval. The computation is then repeated until a satisfactory probable certainty of solution can be achieved.

By processing information using laws of quantum mechanics, quantum computers offer novel ways to perform computation tasks such as molecular calculations, optical photons, optimization, and many more. Many algorithms are introduced to perform such computational tasks efficiently. Also, many promising solid-state implementations of qubits have been demonstrated, including superconducting qubits of diverse flavors, spin qubits, and, charge qubits in various material systems. Typical characteristic energy scales for these systems correspond to radiation frequencies of order 5-10 GHz, allowing it to be readily manipulated using commercial microwave technology. Proposals for novel quantum information processing techniques often rely on a quantum network, linking together multiple qubits or groups of qubits to enable quantum-secure communication, novel metrology techniques, or distributed quantum computing. However, microwave frequency photons are difficult to transmit over long distances. Typical attenuation in low-loss microwave cables at 10 GHz is more than 1 dBm-1, which compares very poorly with optical fibers with losses below 0.2 dBkm-1 at telecom wavelengths ($\lambda \approx 1550$ nm, $f \approx 193$ THz). Moreover, at temperatures above 1 K, there is a substantial thermally created background of microwave photons that precludes the transmission of microwave signals at single-photon fidelities. The advantages of transmitting quantum information over fibers are immediately apparent. Networks of quantum computers are likely to require quantum transducers, which can convert single photons from one frequency to another while maintaining high state-transfer fidelity of quantum information. In particular, a hub-and-spoke distributed quantum computing paradigm in which superconducting qubit quantum computers are networked over long distances requires quantum transduction, because the microwave photons that store quantum information in superconducting qubits are not compatible with room temperature operation. As noted above, the energy of a microwave photon is less than the thermal background energy of room temperature, room-temperature quantum information links at microwave frequencies are either impossible or extremely challenging. Hence, embodiments described and claimed herein provide a unique methodology to up-convert microwave photons from a superconducting quantum processor to optical photons in the infrared telecommunications bands for distribution of quantum information. Such infrared photons can travel long distances in optical fibers without attenuation or interference. At another superconducting quantum processor, another quantum transducer can convert the photon from the infrared back to the microwave domain.

FIG. 1 illustrates a block diagram of an example system 100 that can access data and process that data using variable computing components depicted in accordance with one or more embodiments described herein. The system 100 can facilitate a process of assessing and identifying large amounts of various forms of data, using machine learning, and training a neural network or other types of model. The system 100 can also generate predictive recommendations to an individual level with context in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform operations described herein. Repetitive description of like elements employed in one or more embodiments described herein is omitted for sake of brevity.

The system 100 facilitates that microwave photons from a superconducting quantum processor can be up-converted to optical photons in the infrared telecommunication bands for distribution of quantum information. Such infrared photons can travel long distances in optical fibers with nominal attenuation or interference. At another hub, such as for example another superconducting quantum processor, another quantum transducer can convert the photon from infrared back to the microwave domain.

System 100 can optionally include a server device, one or more networks and one or more devices (not shown). The system 100 can also include or otherwise be associated with an electro-optic system 102 that is coupled to a quantum transducer device 110. The quantum transducer device 110 can include and operatively couple various components including, but not limited to, a microwave resonator 104, an optical resonator 106, and a tuning component 108. In a down conversion method, the optical resonator interacts with the microwave resonator that transduces single optical photons to single microwave photons, wherein the transducing occurs based on at least one of: a voltage pulse applied to the microwave resonator or a modulated laser pulse applied to the optical resonator using the tuning component 108, and thus generate a single microwave photon output 112.

The quantum transducer device 110 can include and operatively couple various components including, but not limited to, a microwave resonator 104, an optical resonator 106, and a tuning component 108. In an up-conversion method, the optical resonator interacts with the microwave resonator that transduces single microwave photons to single optical photons, wherein the transducing occurs based on at least one of a voltage pulse applied to the microwave resonator, or a modulated laser pulse applied to the optical resonator using the tuning component 108, and thus generate a single microwave photon output 112.

System 100 can be any suitable computing device or set of computing devices that can be communicatively coupled to devices, non-limiting examples of which can include, but are not limited to, a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A device can be any device that can communicate information with the systems 100 and/or any other suitable device that can employ information provided by system 100. It is to be appreciated that systems 100, components, models or devices can be equipped with communication components (not shown) that enable communication between the system, components, models, devices, etc. over one or more networks.

The various components of systems 100 can be connected either directly or via one or more networks. Such networks can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology. Moreover, the aforementioned systems and/or devices have been described with respect to interaction between several components. It may be appreciated that such systems and components can include these components or sub-components specified therein, some of the specified components or sub-components, and/or additional components. Sub-components may also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

The subject computer processing systems, methods apparatuses and/or computer program products can be employed to solve new problems that arise through advancements in technology, computer networks, the Internet and the like.

Network of quantum computers likely require quantum transducers, which can convert single photons from one frequency to another while maintaining high state-transfer fidelity of quantum information. In particular, a hub-and-spoke distributed quantum computing paradigm in which superconducting qubit quantum computers are networked over long distances require quantum transduction, because the microwave photons that store quantum information in superconducting qubits are not compatible with room temperature operation. As energy of a microwave photon is less than the thermal background energy of room temperature, room-temperature quantum information links at microwave frequencies are either impossible or extremely challenging. Thus, it is challenging to preserve quantum information in microwave domains over long distances or high temperatures. Microwave domains are constantly generated because of low energy. Preserving the quantum nature of information when it is transferred from one quantum computer to another is valuable. To achieve this nature, frequency of photons needs to be transduced or converted from a microwave domain to an infrared telecom domain. The infrared photons can be sent using ordinary optical fibers over long distances while preserving quantum states. Thus, embodiments disclosed herein provide a promising solution to this problem by up-converting microwave photons from a superconducting quantum processor (a "hub") to optical photons in the infrared telecommunications bands for distribution of quantum information. Such infrared photons can travel long distances in optical fibers (a "spoke") without attenuation or interference. As noted, at another hub, such as another superconducting quantum processor, another quantum transducer can convert the photon from the infrared back to the microwave domain.

Figure 2:
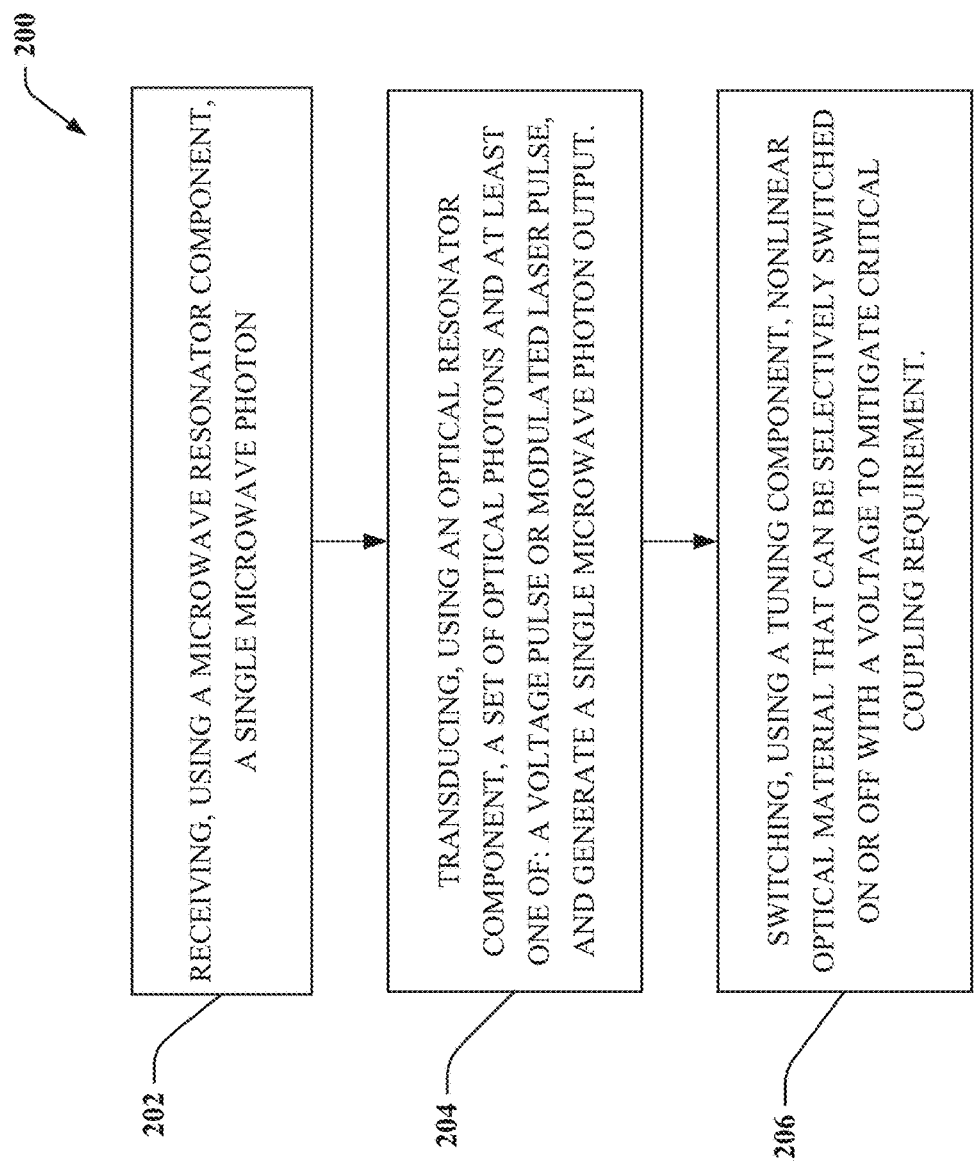
FIG. 2 illustrates an example flowchart of an efficient electro-optic quantum transducer which up-converts microwave photons from a superconducting quantum processor to optical photons in the infrared telecommunication bands for the distribution of quantum information.

FIG. 2 illustrates an example flowchart of a methodology associated with an electro-optic quantum transducer that up-converts microwave photons from a superconducting quantum processor to optical photons in the infrared telecommunication bands for the distribution of quantum information. A superconducting microwave resonator is operable to receive a single microwave photon as denoted at block 202. An optical resonator component has an overlapping magnetic field with a superconducting microwave resonator. The optical resonator component transduces a set of optical photons and at least one of a voltage pulse or modulated laser pulse and generates a single microwave photon output as denoted by block 204. A modulated optical signal source is operable to up convert the single microwave photon to a single optical photon for communication over an optical communication medium. A tuning component comprises a nonlinear optical material that can be selectively switched on or off with a voltage to mitigate critical coupling requirement as denoted by block 206.

An effective $\chi^2$ nonlinear susceptibility is selectively switched on by the voltage and is selectively switched off once transduction is complete. The nonlinear optical material comprises a centrosymmetric material with a strong third-order nonlinear susceptibility ($\chi^{(3)}$) and a nonzero $\chi^{(2)}$ in equilibrium. The optical resonator, pumped by a laser, is gated with a modulator. Also, the microwave resonator component is coupled to a pulsed voltage power supply through a switch and an inductor. An LC band-pass filter can be tuned to the bandwidth of the voltage pulse.

Quantum transducers can transfer quantum information between different systems. There are few general challenges for quantum transducers. Nonlinear optics, which is normally used to convert the frequency of light, usually relies on a high optical photon flux, but quantum transducers can operate on single photons. Secondly, preserving quantum information requires that microwave and optical losses be kept to a minimum. However, many nonlinear optical materials are lossy in the microwave domain. Microwave-optical photon conversion is valuable for future quantum networks to interconnect remote superconducting quantum computers with optical fibers. Also, a very large frequency difference between microwave and infrared photons present additional challenges to nonlinear optics approaches for converting the photons' frequencies. In addition to needing to exhibit a high fidelity of quantum-state transfer, quantum transducers may also have sufficient bandwidth to be compatible with system-level performance. A true microwave-to-optical or optical-to-microwave quantum transducer has not been shown to exist yet. However, many prototype devices have been fabricated that have employed strides towards a quantum transducer. In general, these devices can be divided between those that are based on a resonator that mediates the coupling between the microwave and optical photons, and those that are based on pure nonlinear optics without a mediating degree of freedom. Examples of the mediating degree of freedom include mechanical resonators, atomic optical or spin transitions, the electronic states of defect centers in crystals, or magnum states.

There are a few different approaches to handle quantum networking problems using a single photon. Intermediaries such as mechanical oscillators can be used to convert the frequency of photons. These embodiments focus on directly converting the frequency of nominal optics based on the nonlinear optical property. For single photons, microwave resonators are coupled to optical resonators incorporating nonlinear optical medium. These resonators need to be of high quality to compensate for the fact that single photons are used. Among other quantum transducers that are based on nonlinear optics, the simplest is three-wave mixing in a material that has a nonzero $\chi^{(2)}$ nonlinear susceptibility. In this scheme, microwave and optical resonators are designed to have overlapping electromagnetic fields and resonant modes whose angular frequencies $\omega$ satisfy the following condition:

$$\omega_a - \omega_b = \omega_c,$$

wherein a and b are optical resonator modes and c is a mode of the microwave resonator. This condition allows Raman-type sum or difference frequency generation via three-wave mixing.

Figure 3:
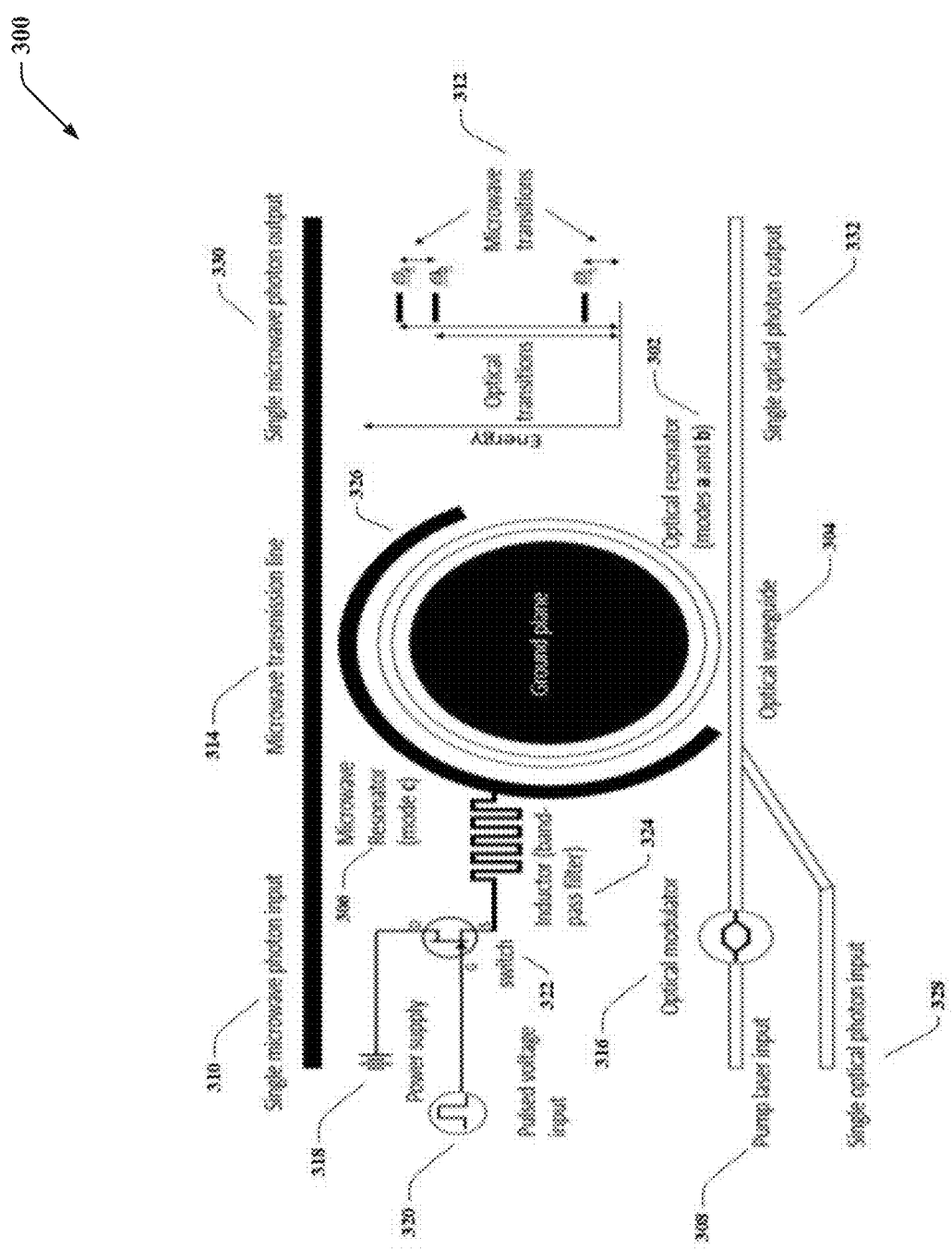
FIG. 3 illustrates an example core active electro-optic transducer which comprises microwave and optical resonators whose electromagnetic fields overlap with one another and overlap with a tunable electro-optic material.

FIG. 3 illustrates an example core active electro-optic transducer which consists of microwave and optical resonators whose electromagnetic fields overlap with one another and overlap with a tunable electro-optic material. In the electro-optic quantum transduction scheme as denoted by block 300, a mode of the optical resonator 302 on an optical waveguide 304 is pumped with a laser 308 (mode a with angular frequency $\omega_a$), and a single input microwave photon 310 (mode c with angular frequency $\alpha_c$) is applied to microwave resonator 306. Through three-wave mixing, the input microwave photon 310 has its frequency converted to an optical photon in mode b of the resonator 302, with angular frequency $\omega_a - \omega_c$. This difference mode generation is a type of Raman process. Alternatively, instead of a microwave photon 310 applied to resonator c as denoted by block 306, a single optical photon 328 can be applied to the optical resonator 302 at an angular frequency $\omega_a - \omega_b$, which can be converted to a microwave photon 330 of resonance $\omega_c$ as denoted by block 312. Alternatively, the signal microwave and pump microwave modes (modes a and b) can be swapped, and the frequency conversion operates via sum frequency generation instead of difference frequency generation. The core of the active electro-optic transducer consists of microwave and optical resonators 302 and 306 whose electromagnetic fields overlap with one another and with a tunable electro-optic material. An exemplary way for the electro-optic material to be tunable is for it to be characterized by a second-order nonlinear optical susceptibility $\chi^{(2)}$ of 0, and to have a nonzero third-order susceptibility ($\chi^{(3)}$), in which case voltage pulses can induce an effective $\chi^{(2)}$ nonlinearity. The microwave and optical resonators are coupled to microwave and optical transmission lines 314 and 304, respectively. The optical resonator is pumped with an external laser 308, which is gated with a modulator 316. The microwave resonator 306 is connected to a pulsed voltage power supply 318 and 320 through a switch 322 and an inductor 324. Together with the capacitance formed between the microwave resonator waveguide 326 and the ground plane, the inductor 324 (of inductance L) forms an LC band-pass filter. The L may be selected to tune this filter to the bandwidth of the voltage pulse 320. Either a pulsed voltage 320 applied to the material or a pulsed or modulated laser 308 is applied to the optical waveguide 304 to drive Rabi oscillations between the microwave and photon populations 330 and 332. Thus, in this schematic layout of the device, the optical resonator 302 is coupled to optical waveguide 304 which can send the pump single photon and couple to microwave resonator 306 which is coupled to its transmission line. Thus, these embodiments add voltage and optical modulator to allow the normality to be switched. The rates have to balance such that the microwave photon converts to optical photons and can leave the device. If the coupling rate is too small, the photon does not convert, and if it is too large then an oscillatory response is obtained.

A theory underlying this electro-optic quantum transduction scheme was developed by Tsang ["Cavity quantum electro-optics. II. Input-output relations between traveling optical and microwave fields," Phys. Rev. A, 84, 1 (2011)]. In this work, the efficiency of a transduction process was calculated based on various rates defining the resonators. These rates include the rate of pump photon population, the external and internal decay rates of the microwave and optical resonators, and the coupling rate between the two resonators. Efficiency of quantum transduction is defined as the fraction of microwave photons that are successfully converted to optical photons (or vice versa). It has been identified that the efficiency of quantum transduction is maximized at a critical coupling condition. Here, the coupling rate between the optical and microwave resonators is precisely balanced by its decay rates, so the energy flows only one way between the input and output photons. If the coupling rate is higher than that prescribed by the critical coupling conditions, then the energy can oscillate between the microwave and optical resonators. If it is too low, then the input photon can undergo excessive decay before it is transduced to the output frequency. This critical coupling condition can impose a difficult trade-off between the efficiency and the bandwidth of the quantum transduction process. It would be preferable for the coupling rate between the resonators to be as high as possible and maximize the transduction rate. Accordingly, an electro-optic quantum transducer that does not rely on the critical coupling is novel and significant.

Figure 4:
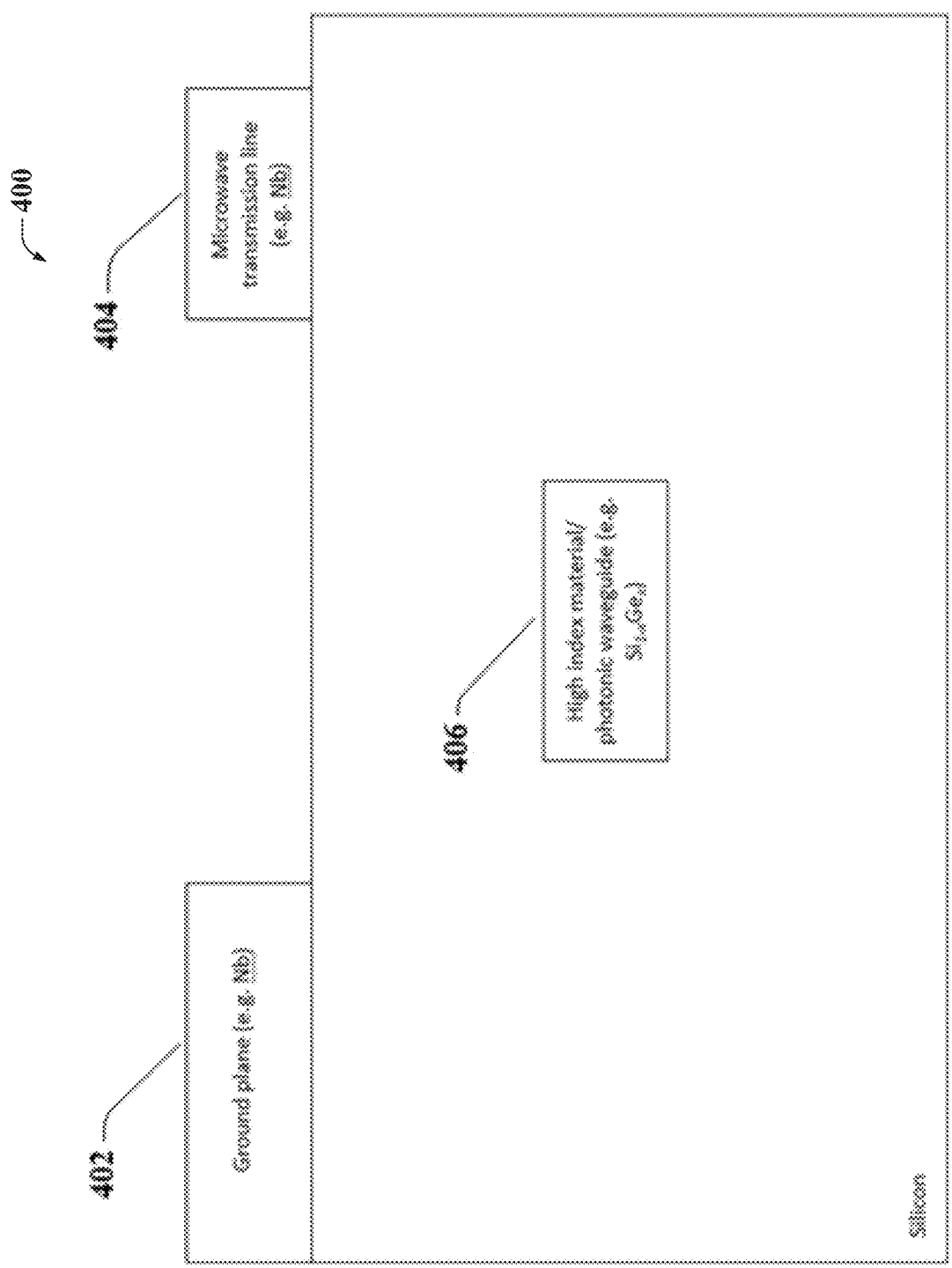
FIG. 4 illustrates an example cross-section corresponding to an exemplary type of an active electro-optic quantum transducer.

FIG. 4 illustrates an example cross-section corresponding to an exemplary type of an active electro-optic quantum transducer. This block diagram 400 is a cross-section corresponding to the dotted bold line in FIG. 3 described above of an exemplary type of active electro-optic quantum transducer. A buried high-index material is surrounded by a lower index material which serves as an optical waveguide, and superconducting transmission lines are fabricated on the top surface of the substrate. An exemplary instance of this type of system would be a $Si_{1-x}Ge_x$ optical waveguide 406 surrounded by Si (4). A superconducting microwave resonator and a transmission line 404 would be fabricated on top of this optical waveguide out of a material such as Nb, Al, or TiN as denoted by ground plane 402. The electromagnetic fields of the microwave region and the optical resonators can have either a significant $\chi^{(2)}$ or $\chi^{(3)}$ nonlinear susceptibility, or both. These embodiments use tunable nonlinear optical materials that can be switched on and off with a voltage to bypass the need for a critical coupling. In this scheme, rather than the coupling rate between the optical and microwave resonators needing to be precisely balanced and for critical coupling to be achieved, a $\chi^{(2)}$ nonlinear susceptibility is simply switched on when needed by a voltage, and then switched off once the transduction process is complete. The voltage can be thought of as driving Rabi oscillations, and the microwave-to-optical or optical-to-microwave population swaps as a π pulse. This type of transduction scheme is called an "active" electro-optic scheme to distinguish it from materials with a $\chi^{(2)}$ that exists in equilibrium or a steady-state effective $\chi^{(2)}$. A material suitable for this transduction scheme could be a centrosymmetric material with a strong third-order nonlinear susceptibility ($\chi^{(3)}$). Centrosymmetric materials have $\chi^{(2)}=0$ (by symmetry). However, applying an electric field to a $\chi^{(3)}$ material can induce an effective $\chi^{(2)}$ effect. Exemplary examples of such materials would be Si or $Si_{1-x}Ge_{1-x}$. Alternatively, materials with a nonzero $\chi^{(2)}$ in equilibrium could still have $\chi^{(2)}$ modulated by an applied voltage. An alternative way to actively drive a π pulse between a microwave an and optical resonator (e.g., swap the photon populations in the two resonators) is to modulate the pump laser on and off for the duration of the π pulse, while not modulating the $\chi^{(2)}$ or effective $\chi^{(2)}$ of the transducer. This could be accomplished with an optical modulator which could either be a conventional discrete optical modulator or one that is integrated on a chip with the active quantum transducer.

Figure 5:
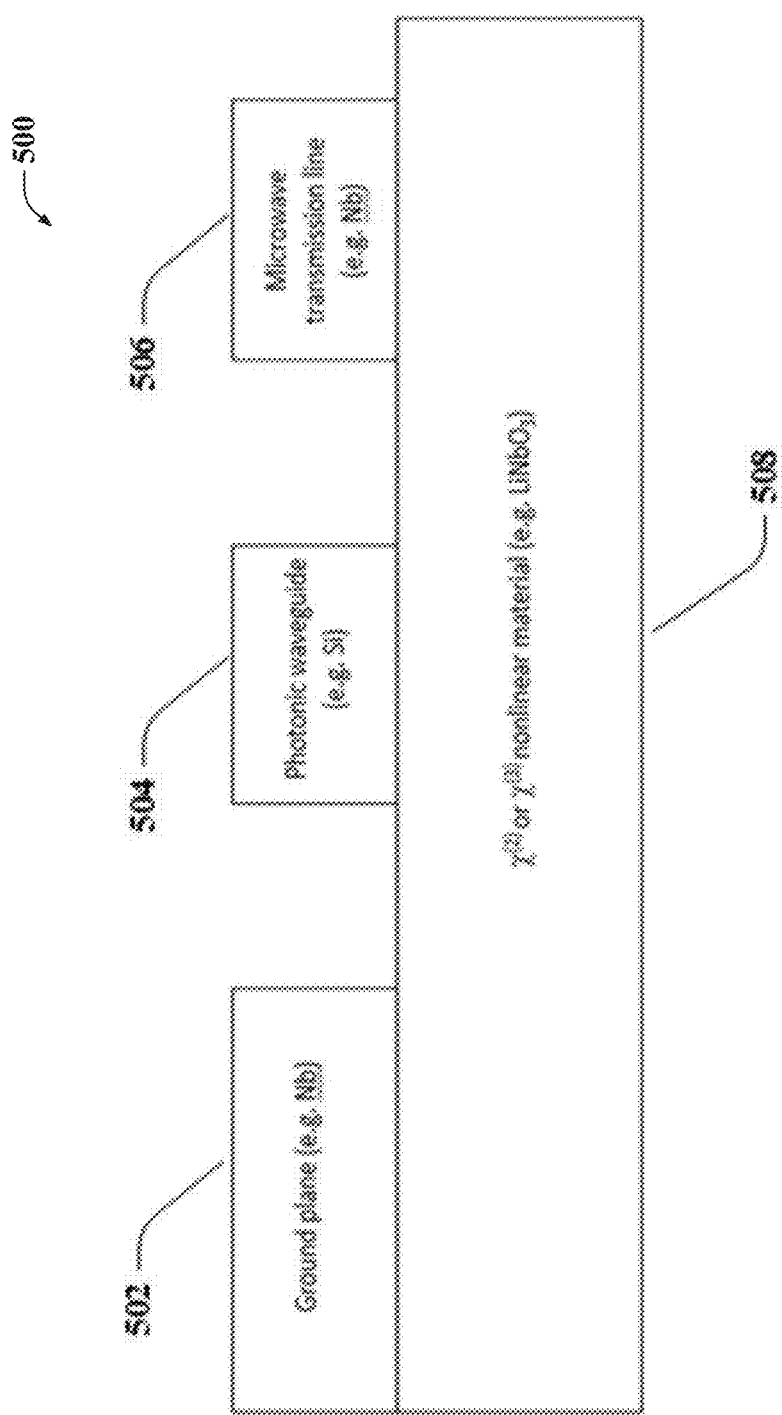
FIG. 5 illustrates an example cross-section of another geometry of an active electro-optic quantum transducer.

FIG. 5 illustrates an example cross-section of another geometry of an active electro-optic quantum transducer. This block diagram 500 is a cross-section of another geometry corresponding to the dotted bold line in FIG. 3 of an exemplary type of an active electro-optic quantum transducer. A superconducting microwave resonator and transmission line 506 would be fabricated on top of this optical waveguide out of materials such as Nb, Al, or TiN as denoted by block 502. Here, instead of a high-index photonic waveguide 504 being buried in another material, it is fabricated on top of another film or substrate. Exemplary examples of that substrate would be $LiNbO_3$, AlN, SiC, or $BaTiO_3$ as denoted by block 508.

Figure 6:
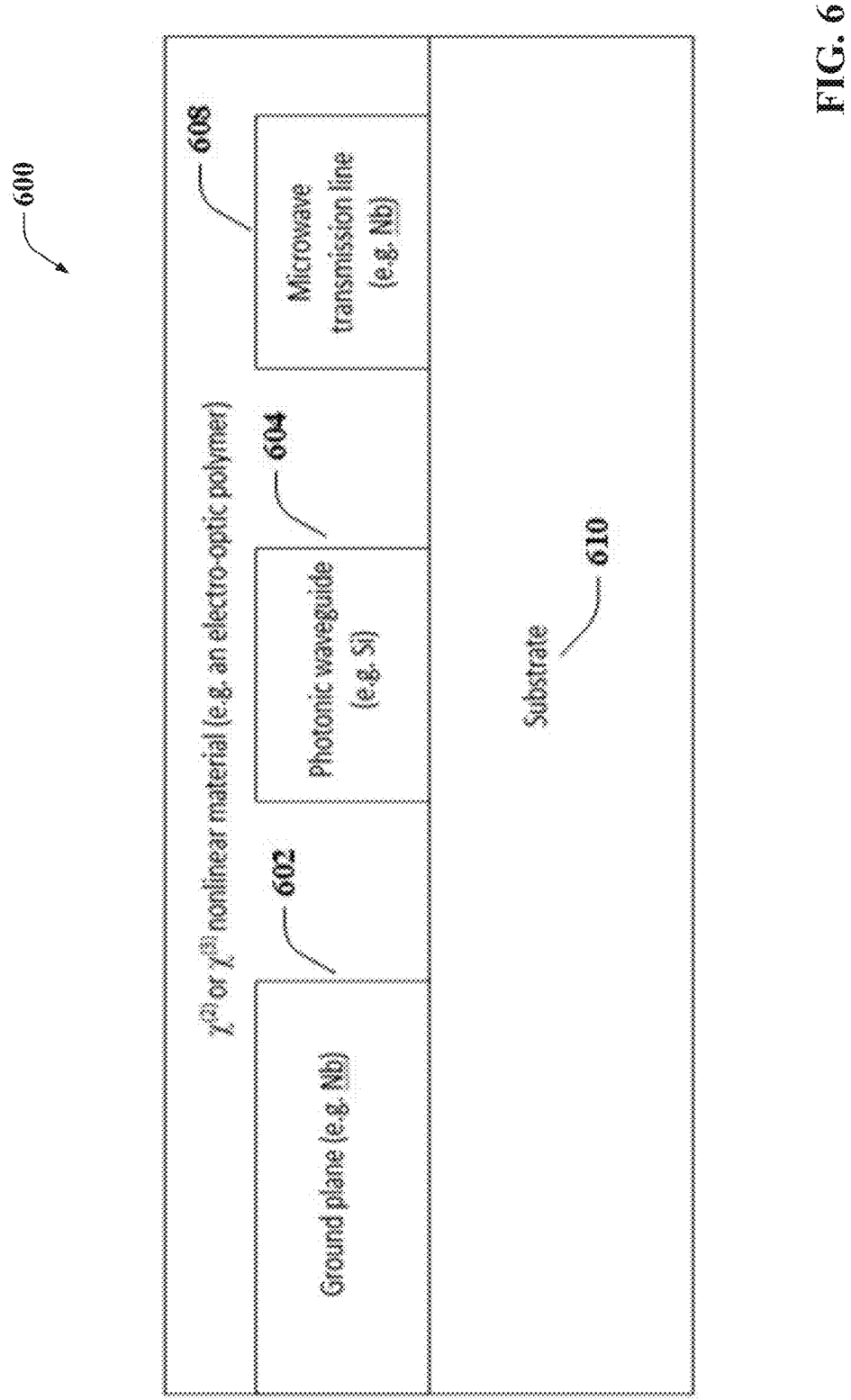
FIG. 6 illustrates an example cross-section of another geometry of an active electro-optic quantum transducer.

FIG. 6 illustrates an example cross-section of another geometry of an active electro-optic quantum transducer. This block diagram 600 is a cross-section of another geometry corresponding to the dotted bold line in FIG. 3 of an exemplary type of active electro-optic quantum transducer. A superconducting microwave resonator and the transmission line as denoted by block 608 would be fabricated on top of this optical waveguide out of a material such as Nb, Al, or TiN as denoted by block 602. Here, neither the photonic waveguide as denoted by block 604 nor the substrate as denoted by block 610 needs to be electro-optic. Rather, an electro-optic material, such as an electro-optic polymer, is deposited on top of the microwave and optical resonators. The general benefits of active electro-optic quantum transducers over passive ones include a higher bandwidth because the coupling rate can exceed that specified by the critical coupling condition. Transduction can be actively turned on and off as needed for the quantum network. The length of the voltage or optical pulse can be fine-tuned as needed to optimize the microwave-to-optical or optical-to-microwave π pulse. In addition to Rabi driving, more advanced quantum control protocols, such as bang-bang control or Laundau-Zener control, can be used to further enhance the transduction rate and/or efficiency.

To simulate the dynamics of an active electro-optic transducer, the following Hamiltonian H is created:

$$H=\hbar\delta_b b^\dagger b+\hbar\omega_c c^\dagger c+\hbar G(b^\dagger c+bc^\dagger)$$

wherein $\delta_b$ is the angular frequency difference between the two optical modes, $b^\dagger$ and b are raising and lowering operators, respectively, for the signal optical mode (mode b), $\omega_c$ is the angular frequency of the microwave mode (mode c), $b^\dagger$ and b are raising and lowering operators, respectively, for the microwave mode, and G is the coupling rate between the microwave and optical modes. After the mode's decay rates are included, it leads to the following equations of motion for the amplitudes of modes b and c:

$$\frac{d}{dt}b = -\left(i\delta_b + \frac{\kappa_b}{2}\right)b - iGc + \sqrt{\kappa_{b,ex}}\, b_{in}e^{-i\delta_b t}$$

$$\frac{d}{dt}c = -\left(i\omega_c + \frac{\kappa_c}{2}\right)c - iGb + \sqrt{\kappa_{c,ex}}\, c_{in}e^{-i\omega_c t},$$

wherein $\kappa_b$ and $\kappa_c$ are the total decay rates of modes b and c, respectively, $\kappa_{b,ex}$ and $\kappa_{c,ex}$ are external decay rates, and $b_{in}$ and $c_{in}$ are the input amplitudes of modes b and c, respectively. A derived parameter in this coupled resonator system is the cooperativity (C), which can be calculated as:

$$C = \frac{4G^2}{\kappa_b\kappa_c}$$

Wherein the C=1 condition corresponds to critical coupling. In the C>1 regime, strong coupling between the resonators can exist and Rabi oscillations can be driven.

Figure 7:
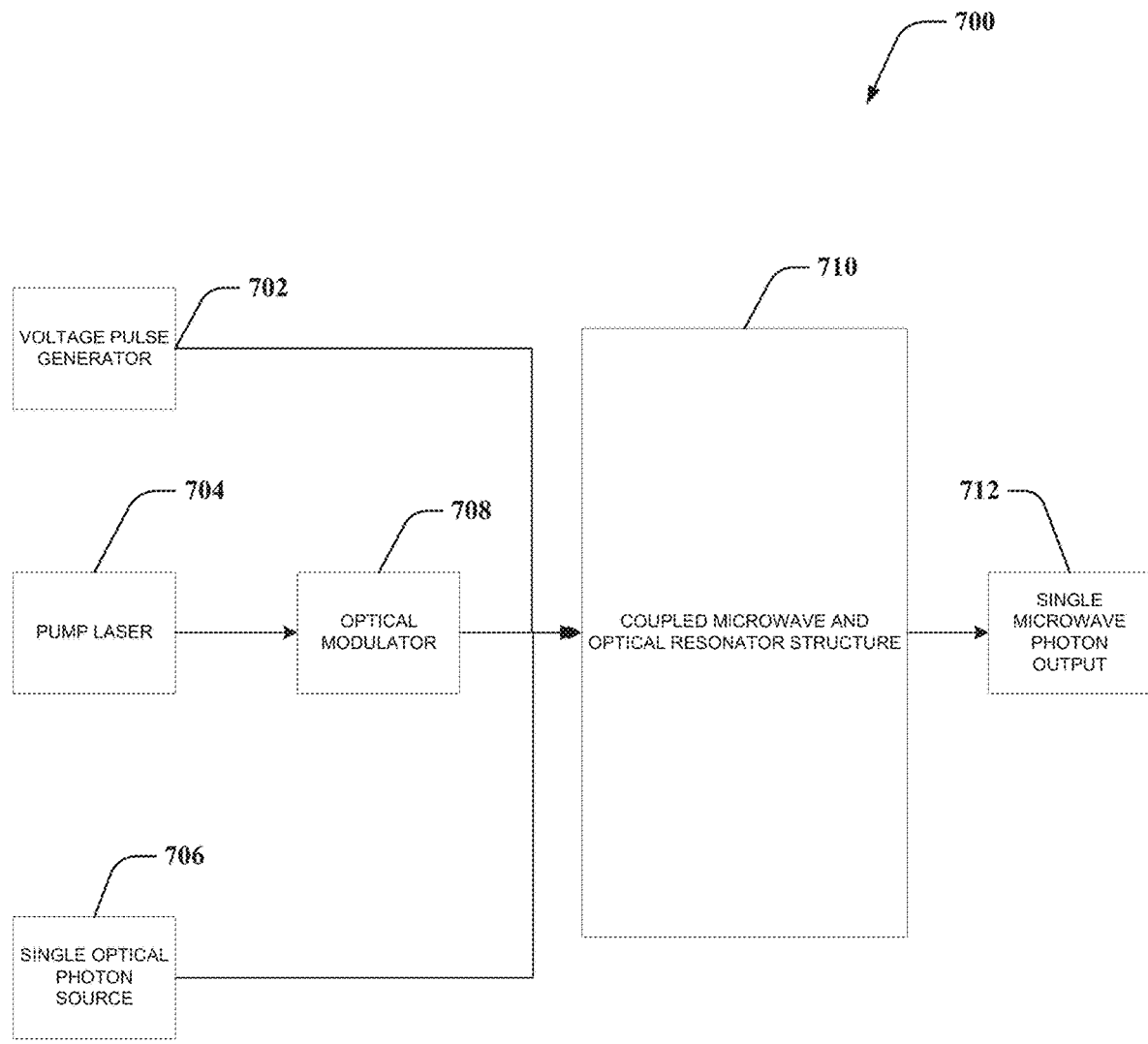
FIG. 7 illustrates an example schematic control structure of an active electro-optic quantum transducer, operating in the optical-to-microwave conversion configuration.

FIG. 7 illustrates an example schematic control structure of an active electro-optic quantum transducer, operating in the optical-to-microwave conversion configuration. The core of the structure as shown in block 700 is the coupled microwave and optical resonator structure 710. The inputs are a pump laser 704, a voltage source pulse generator 702, and a single-photon optical source 706. Either or both of the voltage source or the pump laser can be modulated by optical modulator 708 or pulsed to actively pulse the quantum transduction operation. The output is a single photon microwave source 712, which carries the transduced quantum information of the input optical source.

Figure 8:
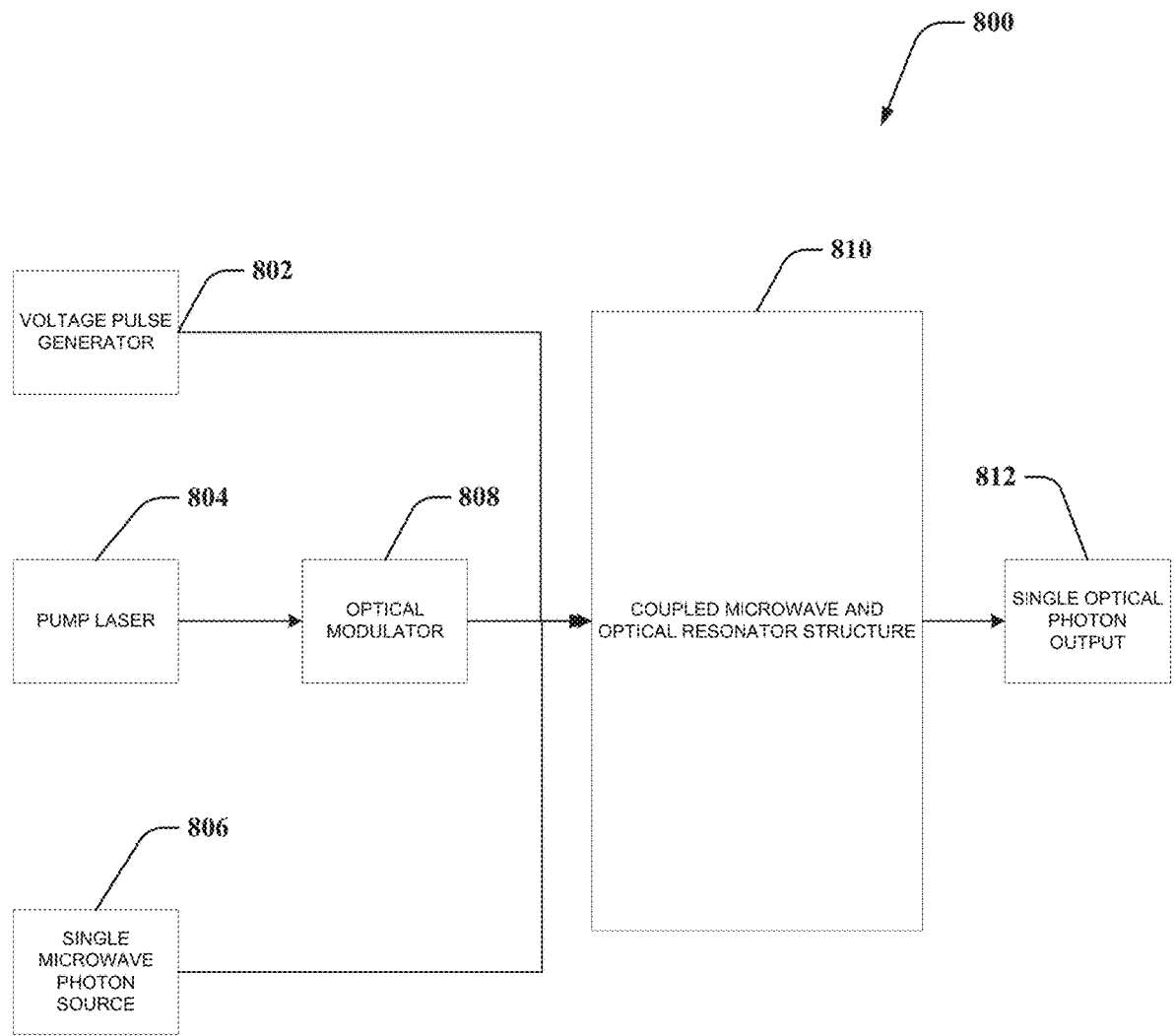
FIG. 8 illustrates an example schematic of a quantum transducer which is operating in a microwave-to-optical conversion configuration.

FIG. 8 illustrates an example schematic of a quantum transducer which is operating in a microwave-to-optical conversion configuration. The core of the structure as shown in block 800 is the coupled microwave and optical resonator structure 810. This is the same schematic as FIG. 7 as described above, except that the quantum transducer is operating in a microwave-to-optical conversion configuration. Either or both of the voltage source 802 or the pump laser 804 can be modulated by optical modulator 804 or pulsed to actively pulse the quantum transduction operation. The input is now a single photon microwave source 806, a pump laser 804, and a voltage source 802. The output is a single photon optical source as denoted by block 812. To solve the equations of motion, either the resonator coupling parameter G is chosen as a constant (e.g., as in passive electro-optic quantum transducers) or vary it via a step function, where G is turned on at t=0 and then set to G=0 at t=$\tau_{pulse}$. The following parameters are fixed as:

$$\omega_c = 2\pi(5 \text{ GHz})$$

which is a typical frequency of a superconducting qubit $\delta_b = 2p$ (5 GHz), e.g., setting the optical frequency difference to the microwave resonance:

$\kappa_b = \kappa_{b,ex} = \omega_b/Q_b$, where $Q_b$ is the quality factor of the optical resonator $Q_b$ $6 \times 10^7$ $\kappa_c = \kappa_{c,ex} = \omega_c/Q_c$, where $Q_c$ is the quality factor of the microwave resonator $Q_c = 100$ $b_{in} = 0$, $c_{in} = 1$ (e.g., the population starts in the microwave mode)

Figure 9:
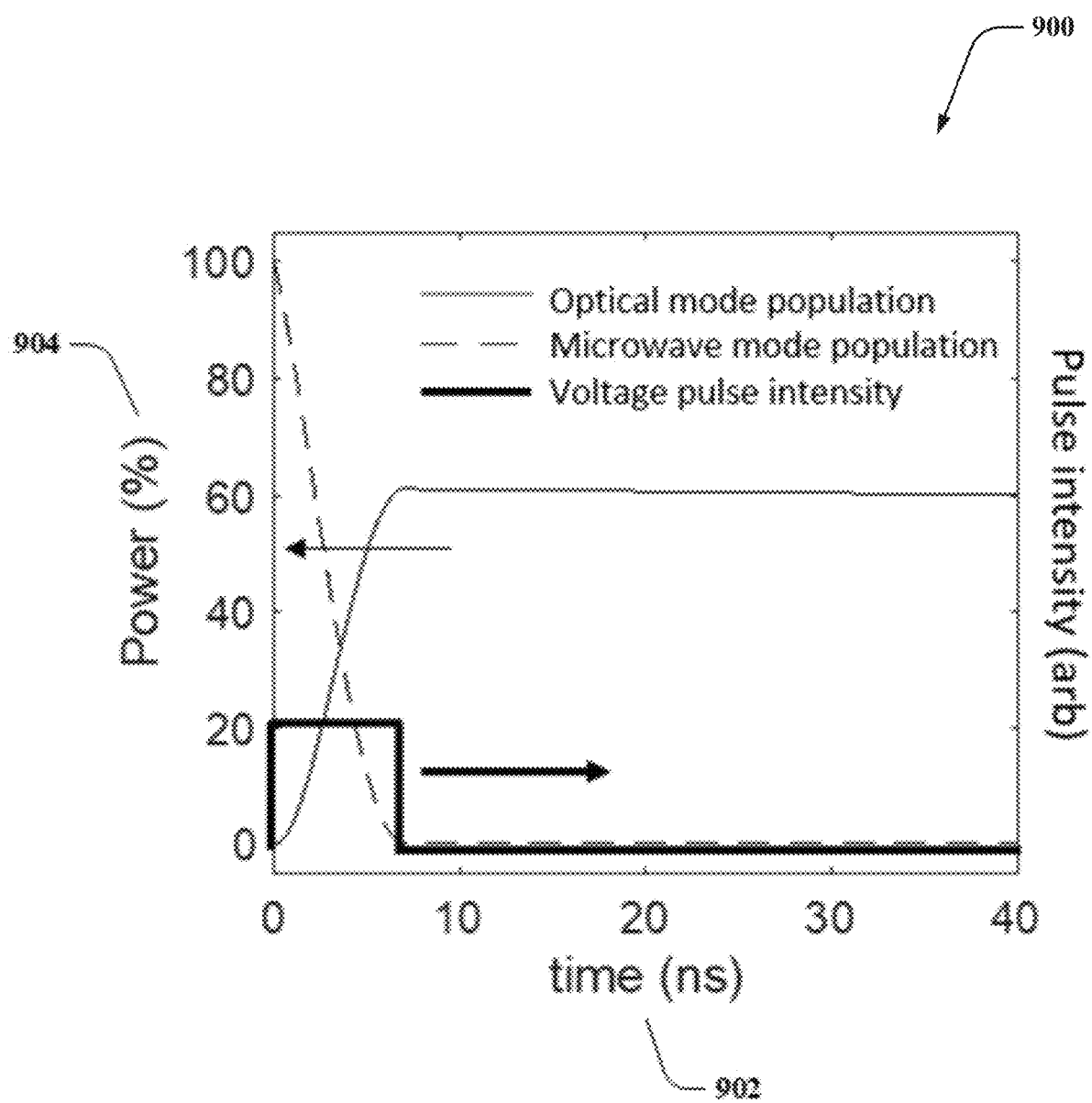
FIG. 9 illustrates an example graph of the voltage pulse corresponding to a pulse in the effective nonlinear susceptibility ($\chi^{(2)}$) of the electro-optic material, and the gating of the coupling strength (G).

FIG. 9 illustrates an example graph of the voltage pulse corresponding to a pulse in the effective nonlinear susceptibility ($\chi^{(2)}$) of the electro-optic material, and the gating of the coupling strength (G). G is pulsed on at 0 ns and 7 ns as shown in graph 900 and displays the solutions to the equations mentioned in the above paragraph using G=200 MHz, C=100, and $t_{pulse}$=7 ns. A voltage pulse intensity lasting 7 ns drives a single Rabi oscillation of the single photon population from the microwave mode population to the optical mode population with 60% efficiency rate. The voltage pulse corresponds to a pulse in the effective $\chi^{(2)}$ of the electro-optic material, and thus the gating of the coupling strength (G). Alternatively, the pump laser can be gated on and off. In the graph, the pulse intensity is determined with time (ns) on x-axis as denoted by block 902 and power (%) on y-axis as denoted by block 904.

Figure 10:
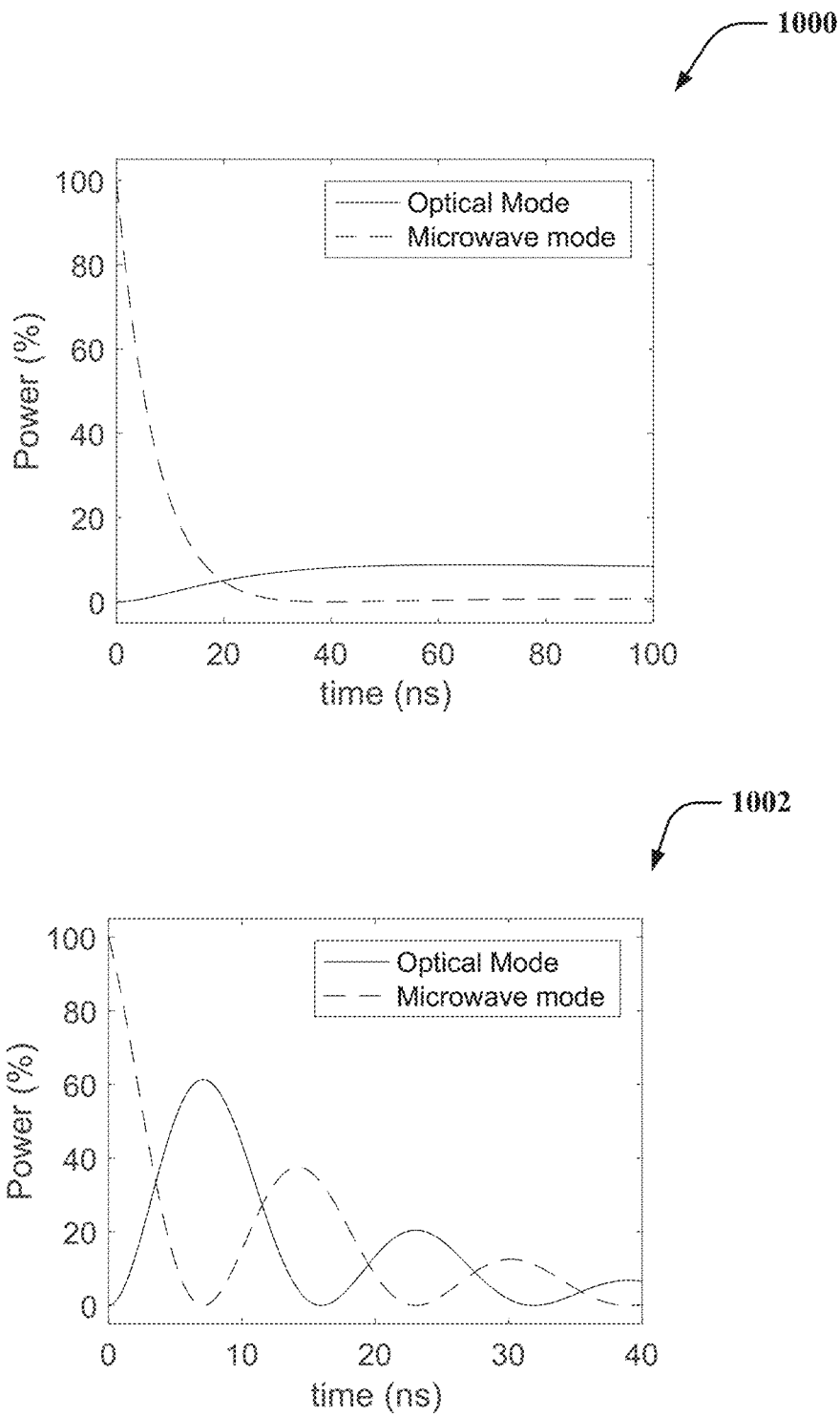
FIG. 10 illustrates an example graph of photon population with no voltage pulse which is transduced from the optical to the microwave mode and the Rabi oscillations which are driven between the modes, resulting in oscillatory populations in the two modes.

FIG. 10 illustrates an example graph of photon population with no voltage pulse which is transduced from the optical to the microwave mode and the Rabi oscillations which are driven between the modes, resulting in oscillatory populations in the two modes. In both of these cases shown in graphs 1000 and 1002, there is no voltage pulse. In graph 1000, G=20 MHz, and C=1 wherein the critical condition is reached. In this critical coupling case, the photon population is transduced from the optical to the microwave mode, but the process employs 40 ns and is only 10% efficient. Microwave-to-optical transduction efficiency of approximately 10% is achieved, which takes 40 ns. In graph 1002, G=200 MHz, and C=100 wherein the power that has been transduced to the optical mode is initially high but decays over time to near zero due to the decay of the Rabi oscillations. In this case, Rabi oscillations are driven between the modes, resulting in oscillatory populations in the two modes. Passive devices result with lower efficiency and a strong pulse may result in an oscillatory response which eventually decays and does not produce any output. The pulsed configuration shown in FIG. 9 has a transduction efficiency of 60%, which is 6 times higher than that of the graph shown in FIG. 10 and the graph 1002 transduction rate is over 5 times higher than that of FIG. 9. These results show that switching G on and off can allow electro-optic quantum transduction to be faster and more efficient than by using a critical coupling. The combined results of the varied parameter G and pulsed G results are shown in the table below as plotted in the graphs mentioned above:

|  | FIG. 9 900 | FIG. 10 1000 | FIG. 10 1002 |
| --- | --- | --- | --- |
| G | 200 MHz | 20 MHz | 200 MHz |
| $\tau_{pulse}$ | 7 ns | unpulsed | unpulsed |
| C | 100 | 1.0 | 100 |

Thus, these embodiments propose this solution wherein microwave photons are converted from a superconducting quantum processor to optical photos in the infrared telecommunication bands for the distribution of quantum information. In this way, the infrared photons can travel long distances in optical fibers without interference. Also, at another hub or a superconducting quantum processor, another quantum transducer can convert the photon from the infrared back to the microwave domain.

Figure 11:
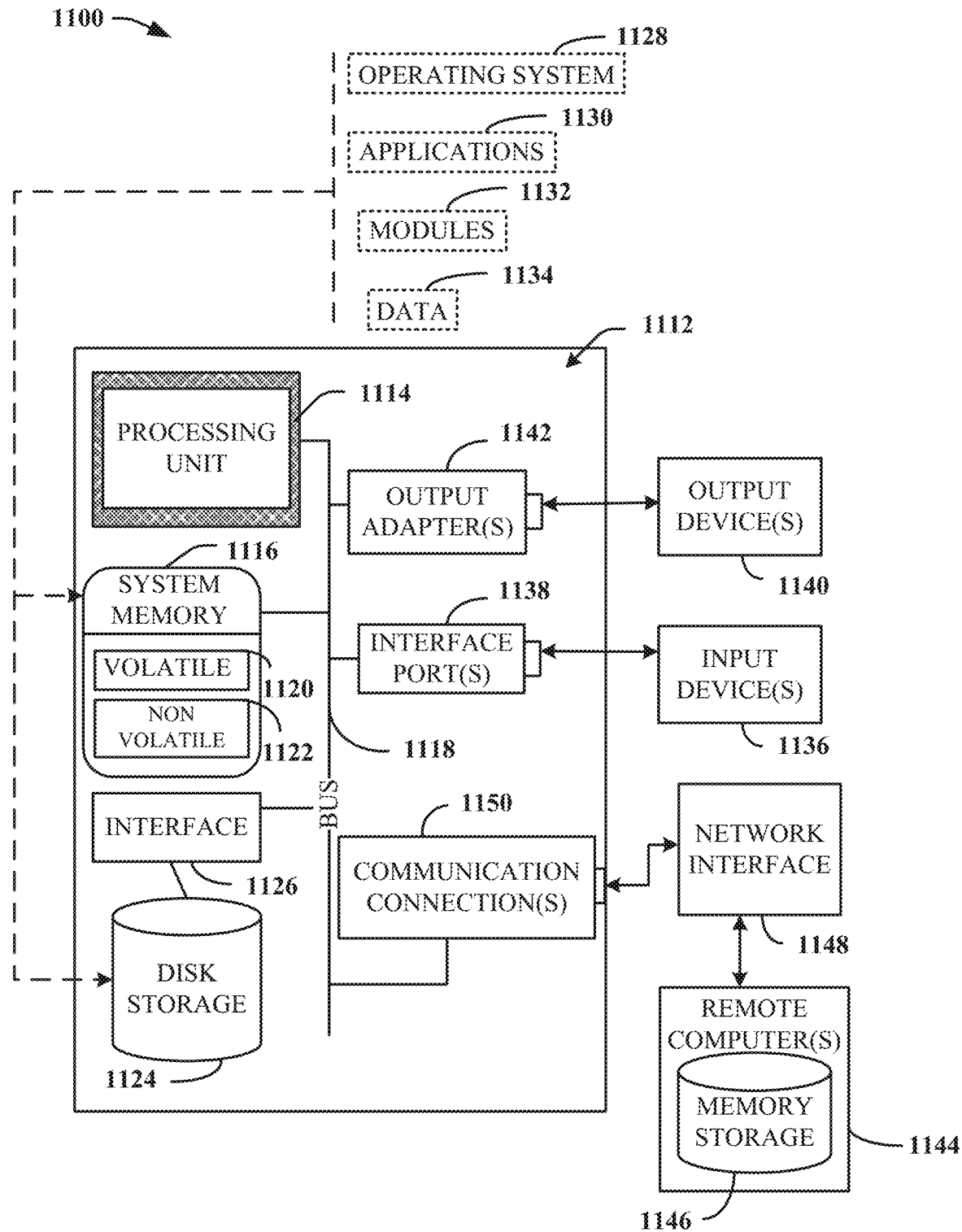
FIG. 11 illustrates a block diagram of an example, non-limiting, operating environment in which one or more embodiments described herein can be facilitated.

To provide context for the various aspects of the disclosed subject matter, FIG. 11 as well as the following discussion are intended to provide a general description of a suitable environment in which the various aspects of the disclosed subject matter can be implemented. FIG. 11 illustrates a block diagram of an example, non-limiting operating environment in which one or more embodiments described herein can be facilitated. Repetitive description of like elements employed in other embodiments described herein is omitted for sake of brevity.

With reference to FIG. 11, a suitable operating environment 1100 for implementing various aspects of this disclosure can also include a computer 1112. The computer 1112 can also include a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114. The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1116 can also include volatile memory 1120 and non-volatile memory 1122. The basic input/output system (BIOS), containing the basic routines to transfer information between elements within the computer 1112, such as during start-up, is stored in non-volatile memory 1122. Computer 1112 can also include removable/non-removable, volatile/non-volatile computer storage media. FIG. 11 illustrates, for example, a disk storage 1124. Disk storage 1124 can also include, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media. To facilitate connection of the disk storage 1124 to the system bus 1118, a removable or non-removable interface is typically used, such as interface 1126. FIG. 11 also depicts software that acts as an intermediary between users and the basic computer resources described in the suitable operating environment 1100. Such software can also include, for example, an operating system 1128. Operating system 1128, which can be stored on disk storage 1124, acts to control and allocate resources of the computer 1112.

System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems. A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port can be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It is to be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a computer, a server, a router, a network PC, a workstation, a microprocessor based appliance, a peer device or other common network node and the like, and typically can also include many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1150 refers to the hardware/software employed to connect the network interface 1148 to the system bus 1118. While communication connection 1150 is shown for illustrative clarity inside computer 1112, it can also be external to computer 1112. The hardware/software for connection to the network interface 1148 can also include, for exemplary purposes only, internal and external technologies such as, modems including regular telephone grade modems, cable modems and DSL modems, ISDN adapters, and Ethernet cards.

Figure 12:
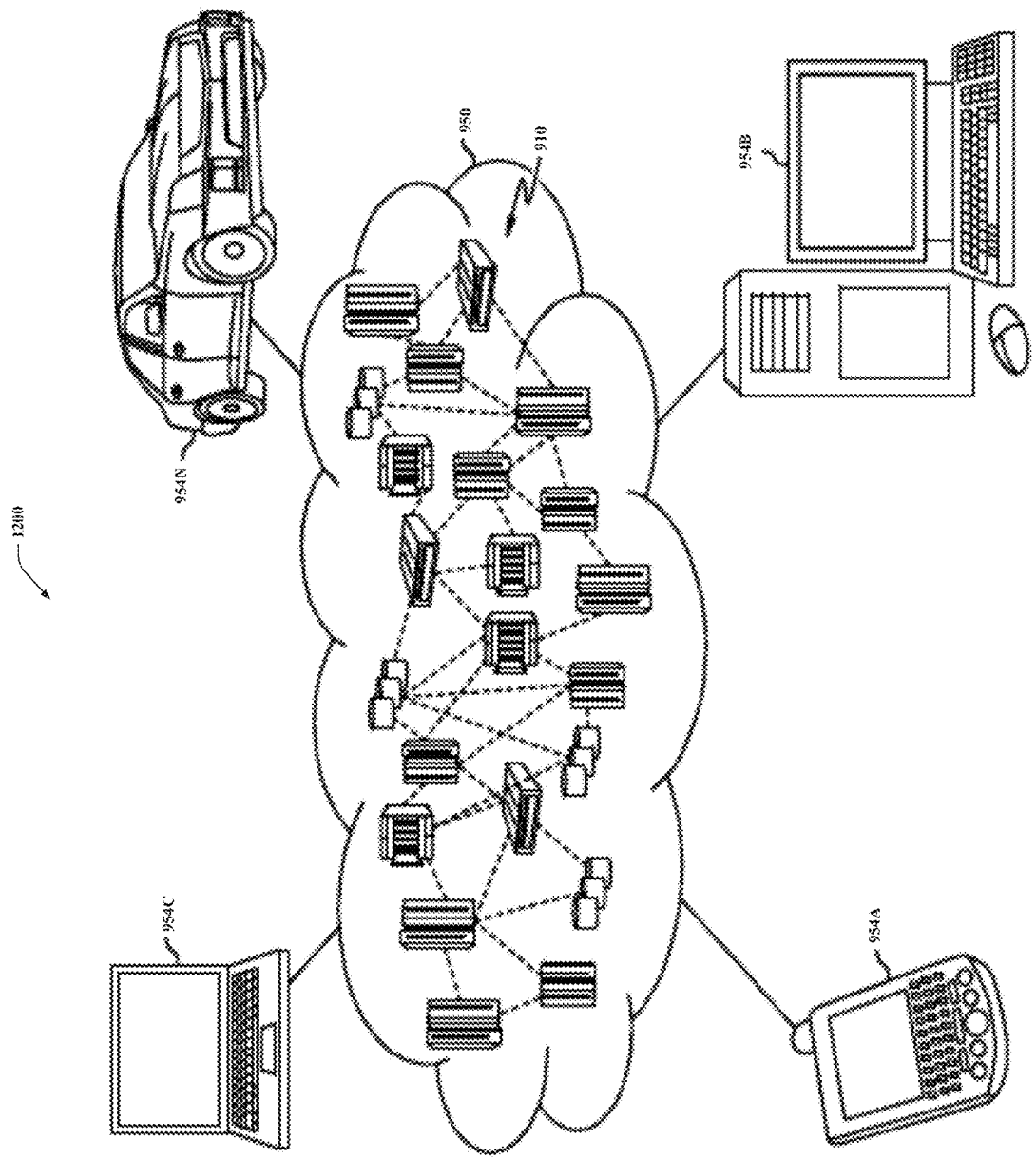
FIG. 12 illustrates a block diagram of an example, non-limiting, cloud computing environment in accordance with one or more embodiments of the subject disclosure.

Referring now to FIG. 12, an illustrative cloud computing environment 1250 is depicted. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Although not illustrated in FIG. 12, cloud computing nodes 1210 can further comprise a quantum platform (e.g., quantum computer, quantum hardware, quantum software, etc.) with which local computing devices used by cloud consumers can communicate. Nodes 1210 may communicate with one another. It may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 12 are intended to be illustrative only and that computing nodes 1210 and cloud computing environment 1250 can communicate with any type of computerized device over any type of network and/or network addressable connection (e.g., using a web browser).

Figure 13:
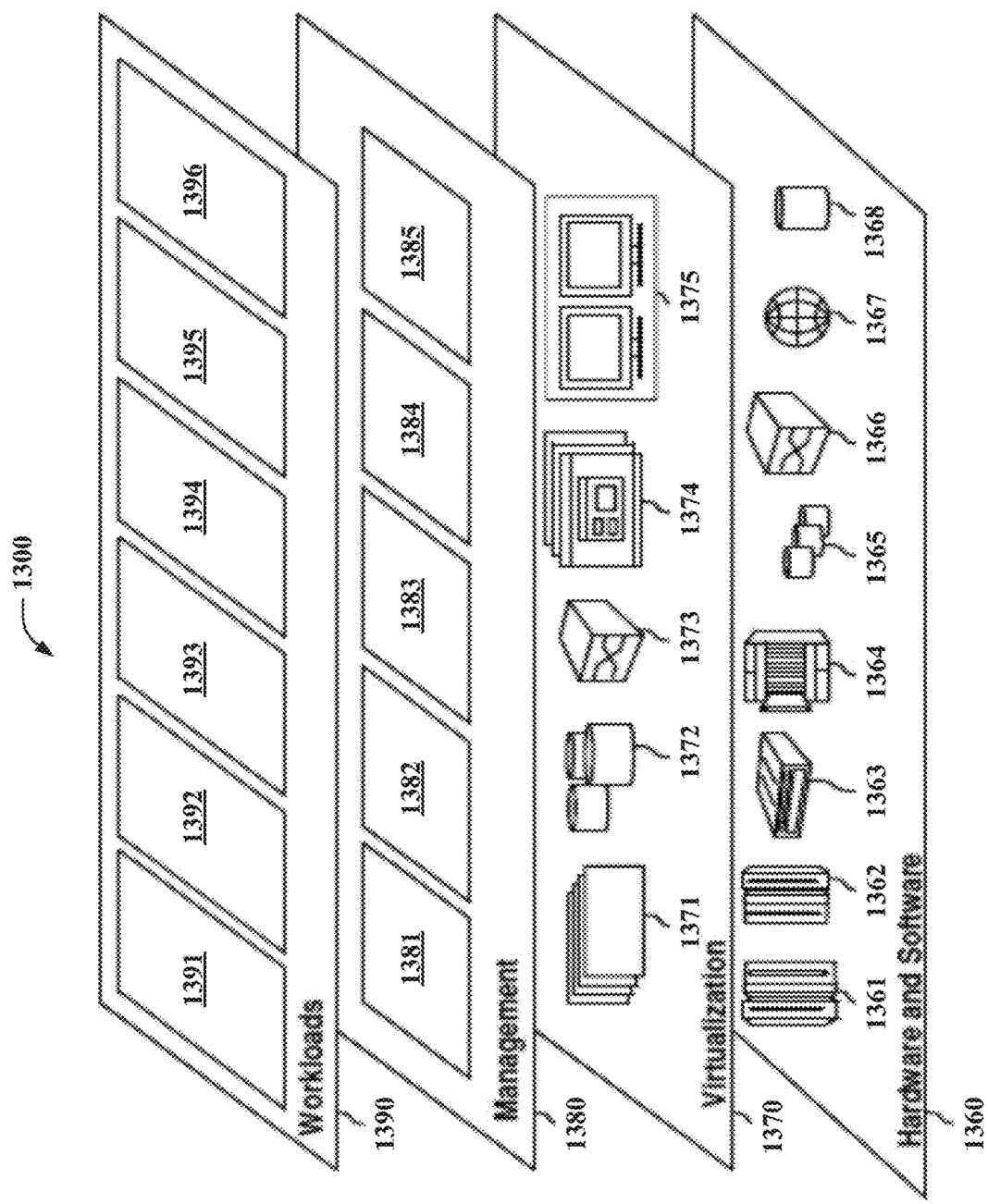
FIG. 13 illustrates a block diagram of example, non-limiting, abstraction model layers in accordance with one or more embodiments of the subject disclosure.

Referring now to FIG. 13, a set of functional abstraction layers provided by cloud computing environment 1250 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 1360 includes hardware and software components. Examples of hardware components include: mainframes 1361; RISC (Reduced Instruction Set Computer) architecture-based servers 1362; servers 1363; blade servers 1364; storage devices 1365; and networks and networking components 1366. In some embodiments, software components include network application server software 1367, quantum platform routing software 1368, and/or quantum software (not illustrated in FIG. 13).

Virtualization layer 1370 provides an abstraction layer from which the following examples of virtual entities may be provided: virtual servers 1371; virtual storage 1372;

virtual networks 1373, including virtual private networks; virtual applications and operating systems 1374; and virtual clients 1375.

In one example, management layer 1380 may provide the functions described below. Resource provisioning 1381 provides dynamic procurement of computing resources and other resources that are utilized to perform tasks within the cloud computing environment. Metering and Pricing 1382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1383 provides access to the cloud computing environment for consumers and system administrators. Service level management 1384 provides cloud computing resource allocation and management such that required service levels are met. Service Level Agreement (SLA) planning and fulfillment 1385 provide pre-arrangement for, and procurement of, cloud computing resources for which a future requirement is anticipated in accordance with an SLA.

Workloads layer 1390 provides examples of functionality for which the cloud computing environment may be utilized. Non-limiting examples of workloads and functions which may be provided from this layer include: mapping and navigation 1391; software development and lifecycle management 1392; virtual classroom education delivery 1393; data analytics processing 1394; transaction processing 1395; and quantum state preparation software 1396.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It can also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or non-volatile memory, or can include both volatile and non-volatile memory. By way of illustration, and not limitation, non-volatile memory can include read only memory (ROM), programmable ROM (PROM), electrically programmable ROM (EPROM), electrically erasable ROM (EEPROM), flash memory, or non-volatile random-access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A quantum transducer device comprising:
   a tuning component that comprises nonlinear optical material, wherein the nonlinear optical material comprises a centrosymmetric material having a zero second-order nonlinear susceptibility ($\chi^{(2)}$) and a non-zero third-order nonlinear susceptibility ($\chi^{(3)}$);
   a microwave resonator; and
   an optical resonator,
      wherein a first electromagnetic field of the microwave resonator overlaps with a second electromagnetic field of the optical resonator, and the first electromagnetic field and the second electromagnetic field overlap with the centrosymmetric material, and
      wherein the optical resonator interacts with the microwave resonator and the centrosymmetric material based on an input that induces a non-zero second-order nonlinear susceptibility ($\chi^{(2)}$) in the centrosymmetric material that causes the interaction to transduce single optical photons to single microwave photons, wherein the input comprises at least one of:
         a voltage pulse applied to the microwave resonator, or
         a modulated laser pulse applied to the optical resonator.

2. The device of claim 1, wherein the non-zero second-order nonlinear susceptibility ($\chi^{(2)}$) of nonlinear optical material can be selectively switched on or off based on the voltage pulse.

3. The system of claim 2, wherein the non-zero second-order nonlinear susceptibility ($\chi^{(2)}$) is selectively switched on by application of the voltage pulse.

4. The system of claim 2, wherein the non-zero second-order nonlinear susceptibility ($\chi^{(2)}$) is selectively switched off by removal of the voltage pulse once the transduction is complete.

5. The system of claim 1, wherein the inducement of the non-zero second-order nonlinear susceptibility ($\chi^{(2)}$) in the centrosymmetric material causes a $\pi$ pulse between the optical resonator and the microwave resonator.

6. The system of claim 1, wherein the optical resonator is coupled to a laser.

7. The system of claim 6, wherein the optical resonator is pumped by the laser which is gated with a modulator.

8. The system of claim 1, wherein the microwave resonator is coupled to a pulsed voltage power supply through a switch and an inductor.

9. The system of claim 1, wherein the centrosymmetric material comprises silicon and germanium.

10. A quantum transducer device comprising:
    a tuning component that comprises nonlinear optical material, wherein the nonlinear optical material comprises a centrosymmetric material having a zero second-order nonlinear susceptibility ($\chi^{(2)}$) and a non-zero third-order nonlinear susceptibility ($\chi^{(3)}$);
    a microwave resonator; and
    an optical resonator,
       wherein a first electromagnetic field of the microwave resonator overlaps with a second electromagnetic field of the optical resonator, and the first electromagnetic field and the second electromagnetic field overlap with the centrosymmetric material, and
       wherein the optical resonator interacts with the microwave resonator and the centrosymmetric material based on an input that induces a non-zero second-order nonlinear susceptibility ($\chi^{(2)}$) in the centrosymmetric material that causes the interaction to transduce single microwave photons to single optical photons, wherein the input comprises at least one of:
          a voltage pulse applied to the microwave resonator, or
          a modulated laser pulse applied to the optical resonator.

11. The device of claim 10, wherein the non-zero second-order nonlinear susceptibility ($\chi^{(2)}$) of nonlinear optical material can be selectively switched on or off based on the voltage pulse.

12. The system of claim 11, wherein the non-zero second-order nonlinear susceptibility ($\chi^{(2)}$) is selectively switched on by application of the voltage pulse.

13. The system of claim 11, wherein the non-zero second-order nonlinear susceptibility ($\chi^{(2)}$) is selectively switched off by removal of the voltage pulse once the transduction is complete.

14. The system of claim 10, wherein the inducement of the non-zero second-order nonlinear susceptibility ($\chi^{(2)}$) in the centrosymmetric material causes a $\pi$ pulse between the optical resonator and the microwave resonator.

15. The system of claim 10, wherein the optical resonator is coupled to a laser.

16. The system of claim 15, wherein the optical resonator is pumped by the laser which is gated with a modulator.

17. The system of claim 10, wherein the microwave resonator is coupled to a pulsed voltage power supply through a switch and an inductor.

18. The system of claim 17, wherein the centrosymmetric material comprises silicon and germanium.

19. A method comprising:
- receiving, by a quantum transducer, a set of microwave photons, wherein the quantum transducer comprises:
  - a tuning component that comprises nonlinear optical material, wherein the nonlinear optical material comprises a centrosymmetric material having a zero second-order nonlinear susceptibility ($\chi^{(2)}$) and a non-zero third-order nonlinear susceptibility ($\chi^{(3)}$),
  - a microwave resonator, and
  - an optical resonator,
  - wherein a first electromagnetic field of the microwave resonator overlaps with a second electromagnetic field of the optical resonator, and the first electromagnetic field and the second electromagnetic field overlap with the centrosymmetric material;
- receiving, by the quantum transducer, an input comprising at least one of a voltage pulse or a modulated laser input, wherein the input causes the optical resonator to interact with the microwave resonator and the centrosymmetric material to induce a non-zero second-order nonlinear susceptibility ($\chi^{(2)}$) in the centrosymmetric material;
- transducing, by the quantum transducer, based on the interaction the induces the non-zero second-order nonlinear susceptibility ($\chi^{(2)}$) in the centrosymmetric material, the set of microwave photons into a single optical photon; and
- outputting, by the quantum transducer, the single optical photon.

20. A method comprising:
- receiving, by a quantum transducer, a set of optical photons, wherein the quantum transducer comprises:
  - a tuning component that comprises nonlinear optical material, wherein the nonlinear optical material comprises a centrosymmetric material having a zero second-order nonlinear susceptibility ($\chi^{(2)}$) and a non-zero third-order nonlinear susceptibility ($\chi^{(3)}$),
  - a microwave resonator, and
  - an optical resonator,
  - wherein a first electromagnetic field of the microwave resonator overlaps with a second electromagnetic field of the optical resonator, and the first electromagnetic field and the second electromagnetic field overlap with the centrosymmetric material;
- receiving, by the quantum transducer, an input comprising at least one of a voltage pulse or a modulated laser input, wherein the input causes the optical resonator to interact with the microwave resonator and the centrosymmetric material to induce a non-zero second-order nonlinear susceptibility ($\chi^{(2)}$) in the centrosymmetric material;
- transducing, by the quantum transducer, based on the interaction the induces the non-zero second-order nonlinear susceptibility ($\chi^{(2)}$) in the centrosymmetric material, the set of optical photons into a single microwave photon; and
- outputting, by the quantum transducer, the single microwave photon.

* * * * *